United States Patent
Cumming et al.

(10) Patent No.: US 9,513,171 B2
(45) Date of Patent: Dec. 6, 2016

(54) TERAHERTZ RADIATION DETECTOR, FOCAL PLANE ARRAY INCORPORATING TERAHERTZ DETECTOR, MULTISPECTRAL METAMATERIAL ABSORBER, AND COMBINED OPTICAL FILTER AND TERAHERTZ ABSORBER

(71) Applicant: The University Court of the University of Glasgow, Glasgow, Strathclyde (GB)

(72) Inventors: David Robert Sime Cumming, Glasgow (GB); James Paul Grant, Glasgow (GB); Iain James Hugh McCrindle, Glasgow (GB)

(73) Assignee: THE UNIVERSITY COURT OF THE UNIVERSITY OF GLASGOW, Glasglow (GB)

( * ) Notice: Subject to any disclaimer, the term of this patent is extended or adjusted under 35 U.S.C. 154(b) by 0 days.

(21) Appl. No.: 14/723,194

(22) PCT Filed: Nov. 26, 2013

(86) PCT No.: PCT/GB2013/053119
§ 371 (c)(1),
(2) Date: May 27, 2015

(87) PCT Pub. No.: WO2014/083326
PCT Pub. Date: Jun. 5, 2014

(65) Prior Publication Data
US 2015/0276489 A1    Oct. 1, 2015

(51) Int. Cl.
*G01J 5/00* (2006.01)
*G01J 5/08* (2006.01)
(Continued)

(52) U.S. Cl.
CPC ............. *G01J 5/0803* (2013.01); *G01J 5/024* (2013.01); *G01J 5/0853* (2013.01); *G01J 5/0881* (2013.01);
(Continued)

(58) Field of Classification Search
CPC .......... G01J 5/20; G01J 5/0853; G01J 5/0803; G01J 5/10
(Continued)

(56) References Cited

U.S. PATENT DOCUMENTS

2012/0057616 A1* 3/2012 Padilla .................. G01J 3/2803
374/179

OTHER PUBLICATIONS

Liu et al. "Infrared Perfect Absorber and its Application as plasmonic sensor" Nano Lett. 2010, vol. 10, pp. 2342-2348.*

* cited by examiner

*Primary Examiner* — David Porta
*Assistant Examiner* — Meenakshi Sahu
(74) *Attorney, Agent, or Firm* — Duane Morris LLP; Amir Tabarrok

(57) ABSTRACT

The invention provides a detector comprising a metamaterial absorber and a micro-bolometer arranged to detect terahertz (THz) radiation. The metamaterial absorber can absorb multiple frequency bands, from the infrared and the THz regions of the electromagnetic spectrum. The detector is scalable to be suitable for use in a focal plane array.

The invention also provides a hybrid of a plasmonic filter, e.g. for optical radiation, and a metamaterial absorber for terahertz (and/or infrared) radiation, to create a single material capable of absorbing narrow band terahertz radiation and filtering radiation in another part of the spectrum, e.g. optical radiation. Such material has great potential in future imaging technology where hybridization can maximize the spectral information density of an optical system.

28 Claims, 12 Drawing Sheets

(51) Int. Cl.
  *G01J 5/02* (2006.01)
  *G01J 5/20* (2006.01)
  *G01J 5/58* (2006.01)
  *G02B 5/00* (2006.01)
  *G02B 1/00* (2006.01)
  *G01J 5/10* (2006.01)
  *G02B 5/22* (2006.01)

(52) U.S. Cl.
  CPC .. *G01J 5/10* (2013.01); *G01J 5/20* (2013.01); *G01J 5/58* (2013.01); *G02B 1/002* (2013.01); *G02B 5/008* (2013.01); *G02B 5/22* (2013.01); *G01J 2005/0077* (2013.01); *G01J 2005/202* (2013.01)

(58) Field of Classification Search
  USPC .................................... 250/338.3, 332, 353
  See application file for complete search history.

TERAHERTZ RADIATION DETECTOR, FOCAL PLANE ARRAY INCORPORATING TERAHERTZ DETECTOR, MULTISPECTRAL METAMATERIAL ABSORBER, AND COMBINED OPTICAL FILTER AND TERAHERTZ ABSORBER

CROSS-REFERENCE TO RELATED APPLICATIONS

This application claims benefit and priority to the International Patent Application No. PCT/GB2013/053119, filed Nov. 26, 2013, entitled "TERAHERTZ RADIATION DETECTOR, FOCAL PLANE ARRAY INCORPORATING TERAHERTZ DETECTOR, MULTISPECTRAL METAMATERIAL ABSORBER, AND COMBINED OPTICAL FILTER AND TERAHERTZ ABSORBER", which further claims benefit and priority to Great Britain Patent Application No. 1221330.2, filed Nov. 27, 2012, entitled "TERAHERTZ RADIATION DETECTOR, FOCAL PLANE ARRAY INCORPORATING TERAHERTZ DETECTOR, AND COMBINED OPTICAL FILTER AND TERAHERTZ ABSORBER", the contents of which are incorporated herein by reference in their entirety.

FIELD OF THE INVENTION

The present invention relates to devices for sensing terahertz (THz) radiation, e.g. for imaging applications. In particular, the invention is concerned with the fabrication and properties of semiconductor chip-based monolithic structures capable of absorbing terahertz radiation, optionally in combination with an optical radiation filtering function.

BACKGROUND TO THE INVENTION

Advancements in the field of terahertz (THz) science and technology have resulted in a number of important applications such as security and medical imaging [1], explosive detection [2], non-destructive testing [3] and wireless communication [4]. Research has been driven by the unique properties of THz radiation: it is non-ionising thus safe to biological tissue; transparent to several common plastics and fibres; and has a shorter wavelength than millimeter waves, giving a higher spatial resolution. In addition several materials, such as explosives and illicit drugs, have characteristic THz spectroscopic signatures that can be readily identified [5, 6]. The proliferation of these applications into everyday life has been hampered by the lack of inexpensive, compact and room-temperature THz sources and detectors.

Known THz detectors typically comprise discrete components that are bulky and exhibit a low level of integration at high cost. Common THz detectors include pyroelectric sensors [7], Schottky barrier diodes [8] and field-effect transistors [9]. However these detectors have one or more limitations such as low sensitivity, slow speed, the requirement for cryogenic cooling and difficulty scaling to array formats required for THz imaging. CMOS transistors are also capable of detecting THz radiation however the detection efficiency drops off markedly above 590 GHz [10]. Most terahertz images today are built up one pixel at a time, through raster scanning with single-point detectors Infrared FPAs have been used in THz imaging experiments however the detection efficiency is typically less than 5% [11].

The lack of natural frequency selective materials that absorb THz radiation has prompted researchers to explore artificial means such as the use of metamaterial (MM) devices [12]. Metamaterials are sub-wavelength elements, the structure of which rather than their composition, dominate their electromagnetic properties. Applications include cloaking [13], superlensing [14] and plasmonically induced transparency [15]. MMs can also be used to create resonant absorber structures where the radiation is absorbed in a device thickness of <λ/30, overcoming the thickness limitation of traditional quarter wavelength devices [16-18].

Optical imaging uses a range of different materials to acquire desired electromagnetic responses for unique applications. However, we are limited by properties of natural materials and must alter their shape or composition to make them suitable for a given purpose. For example, glass must be shaped to act as a lens. Modern nanofabrication techniques give us a method to further extend this concept, such that microscopic changes we make to a material can have macroscopic effects. Two such materials that utilize this method of controlling optical properties are metamaterials (MMs) [28, 29] and plasmonic devices [15].

MMs are micro/nano-structures with an engineered electromagnetic response. Geometric structure and constituent materials can be changed to alter the effective electrical permittivity $\in_{eff}$ and the effective magnetic permeability $\mu_{eff}$ of the bulk material, which determines the electromagnetic behaviour of the device [28, 29]. Through manipulation of the effective bulk material parameters, MMs can be exploited to create perfect lenses [30], invisibility cloaks [31, 32] and perfect absorbers, theoretically capable of having unity absorption [33].

A large range of naturally occurring materials are capable of absorbing radiation within unique frequency bands. Filtering methods can further increase the specificity of detectors and this is the foundation of colour imaging. However, we are limited in the frequency regions of the electromagnetic spectrum that natural materials are capable of detecting. One such region where frequency selective detection is difficult is known as the "terahertz gap", ranging from approximately 0.1 THz to 10 THz. Cleverly designed metamaterials have been shown to be particularly adept terahertz absorbers [18, 19, 21, 34] and through integration with bolometric sensors [35, 36], have potential in terahertz imaging applications.

The fundamental physical process underlying plasmonic devices is known as surface plasmon resonance (SPR), where incident light resonantly couples with surface plasmons (SPs) at a metal/dielectric interface [15, 37-39]. Optical components can be manufactured by exploiting SPR including colour filters [40, 41] and lenses [42-44] which, through design and fabrication, demonstrate a highly controllable electromagnetic response.

Momentum mismatch between the incident light and SPs must be bridged before coupling can occur. Ebbesen et al. reported on the effect of a periodic array of sub-wavelength holes on silver film [15]. Enhanced transmission of visible light through the holes and wavelength filtering was observed due to the hole array providing the additional momentum for SPR. Varying the period, size and position of the holes can alter the filter performance [37, 38].

Plasmonic filters are an excellent alternative to conventional dye filters in complementary metal oxide semiconductor (CMOS) imaging. Dye filters have been shown to exhibit cross talk between photodiodes as the CMOS pixel size scales below 2 μm due to the large distance between filter and photodiode [45]. However, plasmonic filters can be fabricated in a metal layer as part of the CMOS process, thereby decreasing cross talk and fabrication complexity [46-48].

A burgeoning branch of MMs currently provoking wide interest is the topic of so called MM perfect absorbers. By manipulating the effective electrical permittivity, $\in$, and magnetic permeability, $\mu$ absorption close to unity is possible [60]. Traditional electromagnetic absorber structures such as Jaumann absorbers or Salisbury screens [61] require a thickness of $\lambda/4$, where $\lambda$ is the centre wavelength of the incident electromagnetic radiation. MM absorbers, on the other hand, can absorb the incident radiation in far thinner layers, typically $\lambda/35$ [33]. The motivation for studying MM absorbers lies in their potential applications as selective thermal emitters [62], spatial light modulators [63, 64] and in detection and sensing [65, 66]. Single band, dual band and broadband MM absorbers have been demonstrated across all the major wavebands; from the microwave [33], THz [60, 19-21], IR [23] and visible [67]. An extensive overview of the topic can be found in [68].

SUMMARY OF THE INVENTION

The present application discloses two related concepts. The first concept is a detector for terahertz (THz) radiation which is scalable to be suitable for use in a focal plane array. The first concept may also be used in the infrared (IR) range through appropriate scaling of the resonant structures discussed below. The detector may be used purely in the IR or THz range, or may provide a multi-spectral device that can absorb and thus detect radiation in both the IR and THz ranges.

The second concept is a multispectral device comprising a hybrid of a plasmonic filter, e.g. for optical radiation, and a metamaterial absorber for terahertz radiation. These concepts are presented separately below, but their features may be combined as will become apparent from the accompanying discussion.

Herein "terahertz radiation" or "THz radiation" is used to mean electromagnetic radiation having a frequency that lies in a band between sub-millimeter range and far infrared range of the spectrum, e.g. having a frequency in the range 0.3 THz to 3 THz. However, the metamaterial absorber disclosed herein may be scaled to higher frequency regimes, e.g. towards near infrared, i.e. up to 150 THz. The present invention may thus be applicable to a wide range of frequencies, although it has been found to be particularly applicable to THz radiation having a frequency of 1 THz or more, e.g. between 2 and 3 THz.

Herein "infrared radiation" or "IR radiation" is used to mean electromagnetic radiation between near and far infrared, e.g. corresponding to wavelengths of 1-1000 µm, preferably 3-50 µm.

Herein "optical radiation" is used to mean electromagnetic radiation in the visible and near infrared parts of the spectrum.

Terahertz Radiation Detector

At its most general, a first aspect of the invention provides a monolithic resonant THz detector constructed via the integration of a resonant metamaterial absorber with a micro-bolometer sensor. The THz detector can be readily scaled to make a focal plane array (FPA) suitable for integration into active THz imaging systems. A fully integrated FPA, optimised for the THz regime, with high sensitivity and capable of video rate read out is one of the key building blocks that will enable low-cost terahertz cameras. In one embodiment, the resonant THz detector according to this aspect of the present invention may comprise a pixel sensor that demonstrates an absorption magnitude of 60% at 2.52 THz, an average DC responsivity of 118 kV/W and a thermal time constant of 1.1 s.

According to this aspect of the invention, there may be provided a focal plane array (FPA) imaging system for detecting terahertz (THz) radiation, the system comprising a plurality of pixel sensors arranged in a periodic array on a common substrate, wherein each pixel sensor in the plurality of pixel sensors comprises: a resonant metamaterial absorber, and a micro-bolometer sensor mounted on the metamaterial absorber, and wherein adjacent pixel sensors in the plurality of pixel sensors are separated by thermal isolation regions. By mounting the micro-bolometer sensor on the metamaterial absorber, the invention provides a THz radiation detector that exhibits scalability suitable for individual pixels in an FPA. Thermal crosstalk between pixels is minimised by providing thermal isolation regions, which can ensure that the thermal time constant for the system is low enough to be of practical benefit. The isolating region may be arranged to inhibit the flow of heat and/or current between adjacent pixel sensors.

The metamaterial absorber may have a symmetrical shape adapted to ensure the pixel sensor is polarization insensitive. For example, the metamaterial absorber may comprise an electric ring resonator (ERR) structure having a symmetrical shape. In one embodiment, the electric ring resonator structure may be cross-shaped, i.e. having conductive members extending orthogonally to one another to support coupling to any orientation of an incident electric field. Of course, in other embodiments, sensitivity to the polarization of incident radiation may be useful. Accordingly, the metamaterial absorber may comprise an asymmetric resonator structure, e.g. ERR structure.

The resonant metamaterial absorber may comprise an electrically conductive ground layer, sometimes referred to as a ground plane, a layer of dielectric material on the ground layer, and an electrically conductive active layer separated from the ground layer by the dielectric material. The active layer may have a resonant geometry selected to couple electric field components of an incident THz radiation wave. The presence of the ground layer may cause the magnetic field component of the THz radiation wave to induce anti-parallel currents in the active layer and ground layer.

The thickness of the resonant metamaterial absorber may be less than a quarter of the wavelength $\lambda$ of the THz radiation to be detected, preferably less than $\lambda/30$.

The absorption characteristics of the resonant metamaterial absorber may be controlled through appropriate selection of parameters, e.g. any one or more of the geometry of the active layer, the thickness of the dielectric layer and the material of the dielectric layer (which may affect its relative permittivity and relative permeability).

In one embodiment, the active layer is a cross-shaped layer, e.g. having a '+' shape comprises two orthogonal elongate strips which meet at their centre points, formed on a surface of the dielectric layer opposite to the ground layer. The elongate strips may have the same width and length to impart symmetry to the active layer. The width and length of the elongate strips may be parameters that are selected to "tune" the absorption characteristics of the resonant metamaterial absorber in a desired manner. Preferably the impedance of the metamaterial structure is matched to free space to maximize the absorption magnitude.

The cross-shaped layers in adjacent pixel sensors may be aligned so that the elongate strips lie along common orthogonal axes across the surface of the focal plane array. However, the focal plane array may include a plurality of resonant geometries to permit dual band or broadband absorption across the THz radiation range, e.g. from 0.3 THz to 3 THz or more, e.g. from 0.3 THz to 150 THz. The dual band nature of the absorber may be provided by a second active layer in the dielectric, i.e. a second layer of resonant structures that are tuned to a different frequency, and yet do not interfere with the absorption of the primary active layer.

Thus, the metamaterial absorber of each pixel sensor may further comprise: a second electrically conductive active layer mounted in the dielectric material between the electrically conductive active layer and the electrically conductive ground layer, wherein the second electrically conductive active layer comprises a plurality of resonant structures arranged to couple to the electric field of an incident infrared (IR) radiation wave. The second electrically conductive active layer may be an array of resonant structure that are configured in a similar manner to the resonant structure(s) on the electrically conductive active layer, but with smaller dimensions. For example, the second electrically conductive active layer may comprise a plurality of metal cross-shaped structure (e.g. ERRs). Each cross-shaped structure may occupy a IR unit cell area. There may be 10 or more, e.g. 15, IR unit cell areas within a single pixel.

In one embodiment, the primary electrically conductive active layer may be resonant at around 2.9 THz and the second electrically conductive active layer resonant to IR radiation having a wavelength of around 4 µm.

The pixel sensors may be arranged periodically across the focal plane array. The period may in the range 2 µm to 150 µm. The period may be dictated by the desired absorption frequency, e.g. about 60 µm for desired absorption frequencies of 1 THz. In one embodiment the pixel sensors are arranged across the focal plane array with a period of 30 µm. In this arrangement, the width of each elongate strip may be 10 µm and the length of each elongate strip may be 27 µm.

The period of the pixel sensors on the focal plane array may be another parameter usable to tune the absorption frequency of the device.

Any suitable stable conductive thin film may be used for the ground plane and active layer. For example, any of Ti/Au alloy, Au, Al, Cu may be used. The thickness of the ground layer and active layer may be selected appropriately. In one embodiment the thickness is 150 nm.

The dielectric layer may be formed from any insulator e.g. $SiO_2$, $Al_2O_3$, $Si_3N_4$, insulating polymers, etc. The thickness of the insulating layer may be selected to assist in determining the absorption magnitude. In one embodiment, the dielectric layer may have a thickness of 3 µm. This thickness may be suited for an absorption frequency around 2 THz, e.g. 2.15 THz or 1.93 THz. Thinner insulating layers may be required above 2 THz while thicker layers may be required below 2 THz.

The micro-bolometer sensor may comprise a heat sensitive element, e.g. of a layer of vanadium oxide, mounted in thermal communication with the resonant metamaterial absorber. Other materials suitable for use as a heat sensitive layer may include platinum of the like. Alternatively, the heat sensitive element may comprise any semiconductor temperature detector that exhibits a suitable temperature response. Such semiconductor temperature detectors may include any of a silicon pn diode, a polysilicon resistor and a field-effect transistor. In one embodiment, the heat sensitive layer is mounted over the active layer. An electrically insulating layer, e.g. of silicon nitride, may isolation the electrical currents in the active layer from the heat sensitive layer, whilst providing efficient transfer of thermal energy. It may be preferably to mount the heat sensitive layer over the active layer because the majority of absorbed THz power occurs in the dielectric layer just below the active layer.

The isolation region between adjacent pixel sensors may include physical gaps between the electrically insulating layer (silicon nitride), dielectric layer ($SiO_2$) and ground layer of adjacent pixel sensors. The active layer and heat sensitive layer are already physically separate between adjacent pixel sensors. For example, if the ground layer, electrically insulating layer and dielectric layer may have dimensions less than the period of the pixel sensors, e.g. for a square array of pixel sensors having a period of 30 µm, the ground layer, electrically insulating layer and dielectric layer may have dimensions of 26×26 µm.

Electrically conductive tracks, e.g. made of Ti/Au, are connected to the heat sensitive layer, and may be used to measure the change in electrical resistance of the heat sensitive layer to provide a measurement of absorbed THz radiation. The tracks may be made of a thin metallic layer with low thermal conductance in order to minimise unwanted heat transfer away from the heat sensitive layer.

The common substrate may be silicon. The structures discussed above may be fabricated on the silicon using any suitable microfabrication technique, such as photolithography or electron beam lithography.

A window may be formed in the backside surface of the substrate, e.g. using a conventional etching process, to create a membrane for the focal plane array.

An individual pixel sensor from the focal plane array may be a THz radiation detector that is an independent aspect of the invention. According to this aspect there is provided a detector for terahertz (THz) radiation, the detector comprising a resonant metamaterial absorber, and a micro-bolometer sensor mounted on the metamaterial absorber, wherein the metamaterial absorber comprises an electrically conductive active layer mounted on a first surface of a dielectric material, a electrically conductive ground layer mounted on a second surface of a dielectric material opposite the first surface, and wherein the electrically conductive active layer has a symmetrical geometry arranged to couple to the electric field of an incident THz radiation wave. The detector may include any of the features of the pixel sensors described above.

Similarly, the fully integrated multispectral absorber structure mentioned above may be an independent aspect of the invention. According to this aspect, there is provided a metamaterial absorber for infrared (IR) and terahertz (THz) radiation, the absorber comprising: a layer dielectric material; a first electrically conductive active layer mounted on a first surface of the dielectric material, an electrically conductive ground layer mounted on a second surface of the dielectric material opposite the first surface, and a second electrically conductive active layer mounted in the dielectric material between the electrically conductive active layer and the electrically conductive ground layer, wherein the first electrically conductive active layer has a resonant geometry arranged to couple to the electric field of an incident THz radiation wave, and wherein the second electrically conductive active layer comprises a plurality of resonant structures arranged to couple to the electric field of an incident infrared (IR) radiation wave. This metamaterial absorber may be combined with a micro-bolometer sensor as discussed above to provide a detector for infrared (IR) and terahertz (THz) radiation.

Filter/Absorber Hybrid

Plasmonic filters and metamaterial absorbers are relatively new components for filtering and absorbing unique spectral bands of electromagnetic radiation, respectively. They may find particular use as optical components, where, through the careful design of each of these materials, the cumulative responsivity can range from visible through to far infrared (FIR) wavelengths. At its most general, a second aspect of the present invention relates to a hybridisation of these two methods of wavelength discrimination, to provide a single material capable of absorbing narrow band terahertz radiation and filtering radiation in another part of the spectrum, e.g. optical radiation. In one embodiment, the material may filter fifteen discrete visible wavelengths and one near infrared (NIR) wavelength. Such material has great potential in future imaging technology where hybridisation can maximise the spectral information density of an optical system.

According to the second aspect of the invention, there is provided a combined plasmonic filter and THz radiation absorber device comprising: a resonant metamaterial absorber having an electrically conductive ground layer, an electrically conductive active layer having a resonant geometry, and a dielectric material separating the ground layer from the active layer, wherein the device includes a surface plasmon supporting layer patterned with a periodic array of surface discontinuities to function as a plasmonic filter. The surface plasmon supporting layer may be the active layer or the ground layer, or may be an additional layer fabricated in a multi-layer device.

The plasmonic filter may be arranged to filter any part of the spectrum. The resonant metamaterial absorber may be arranged to transmit the radiation filtered by the plasmonic filter. Thus, the plasmonic filter may be adapted to transmit a predetermined band of radiation, and the active layer and dielectric material may be arranged to transmit the predetermined band of radiation. For example, the active layer may include gaps therein for transmitting the predetermined band of radiation. In one embodiment, the device is arranged to filter optical radiation. In this embodiment, the metamaterial absorber may be arranged to transmit optical radiation, e.g. through the spaces between adjacent resonant structures and through the dielectric material and the ground layer may be patterned with a periodic array of surface discontinuities to function as a plasmonic filter for the transmitted optical radiation.

This aspect of the invention thus provides a hybridisation of two technologies—a metamaterial (MM) absorber and one or more plasmonic filters—to create a new type of material. This device is capable of absorbing terahertz radiation and filtering visible and/or near IR light, thereby eliminating the requirement for multiple optical components to achieve these purposes. The inventors have discovered, and demonstrate through the detailed discussion below, that the presence of plasmonic filters on a metamaterial absorber has a negligible impact on its responsivity and that plasmonic filtering of visible wavelengths is unaffected by a resonant conductive layer (such as an electric ring resonator structure).

This new material may have far reaching implications for the future of detector technology. It ensures that the spectral information that can be acquired per unit area is maximised and can therefore be used to make high resolution, multipurpose detectors.

The device defined above may be used as a component cell of a practical system. Thus, in another expression of the second aspect of the invention, there may be provided a multispectral device for filtering optical radiation and absorbing THz radiation, the device comprising a plurality of filter/absorber hybrid cells mounted in a periodic array, each filter/absorber hybrid cell comprising: a resonant metamaterial absorber having an electrically conductive ground layer, an electrically conductive active layer having a resonant geometry, and a dielectric material separating the ground layer from the active layer, wherein the active layer and dielectric material are adapted to transmit optical radiation, and wherein the ground layer is patterned with a periodic array of surface discontinuities to function as a plasmonic filter for the transmitted optical radiation.

The plurality of hybrid cells may be fabricated on a common ground layer. The surface discontinuities in the ground layer may be any suitable formation to impart the necessary momentum to enable surface plasmon resonance to occur. The size of the surface discontinuities is less than the wavelength of the optical radiation to be filtered. In the embodiments, discussed below, the surface discontinuities comprise a periodic array of holes in the ground layer. The periodic array may have any suitable geometry, such as a square array, triangular array, etc. The holes may be any suitable shape having nanoscale dimensions, e.g. circular, elliptical, triangular, square or oblong.

The optical filter characteristics may be controlled by varying the period, size and position of the surface discontinuities. For example, the ground layer may have a triangular array of nanoholes fabricated therein. Herein "nanoholes" may mean holes having a diameter less than 500 nm, preferably less than 300 nm.

The metamaterial absorber may have a symmetrical shape adapted to ensure that the hybrid cell is polarization insensitive. For example, the active layer of the metamaterial absorber may comprise an electric ring resonator (ERR) structure having a symmetrical shape. In one embodiment, the electric ring resonator structure may be cross-shaped, i.e. having conductive members extending orthogonally to one another to support coupling to any orientation of an incident electric field. Alternatively, the metamaterial absorber may be asymmetric in order to exhibit polarization sensitivity.

The thickness of the resonant metamaterial absorber may be less than a quarter of the wavelength $\lambda$ of the THz radiation to be absorbed, preferably less than $\lambda/30$.

The absorption characteristics of the resonant metamaterial absorber may be controlled through appropriate selection of parameters, e.g. any one or more of the geometry of the active layer, the thickness of the dielectric layer and the material of the dielectric layer (which may affect its relative permittivity and relative permeability).

In one embodiment, the active layer is a cross-shaped layer, e.g. having a '+' shape comprises two orthogonal elongate strips which meet at their centre points, formed on a surface of the dielectric layer opposite to the ground layer. The elongate strips may have the same width and length to impart symmetry to the active layer. The width and length of the elongate strips may be parameters that are selected to "tune" the absorption characteristics of the resonant metamaterial absorber in a desired manner. Preferably the impedance of the metamaterial structure is matched to free space to maximize the absorption magnitude.

The cross-shaped layers in adjacent hybrid cells may be aligned so that the elongate strips lie along common orthogonal axes across the surface of the device. However, the device may include a plurality of resonant geometries to permit dual band or broadband absorption across the THz radiation range, e.g. from 0.3 THz to 3 THz or more.

The hybrid cells may be arranged across the device with a period of 27 μm. In this arrangement, the width of each elongate strip may be 10 µm and the length of each elongate strip may be 26 µm. In one embodiment, the inside of each resonant structure (e.g. each cross-shaped layer) may be removed to provide a desirable metamaterial response. Removing this material may also assists with optical transmission, in addition to the regions between adjacent resonant structures, which will also transmit optical radiation.

Preferably the inside of each strip, e.g. the area located inside a 5 µm border around the outer edges, is removed to facilitate provide a desired absorption response. As disclosed above, the actual period used may be dictated by the desired absorption frequency, e.g. from about 60 µm for desired absorption frequencies of 1 THz and reducing as the desired absorption frequency increases.

Any suitable stable conductive thin film may be used for the ground plane and active layer. For the ground plane which supports the surface plasmon resonances, any material that shows a plasma resonance in the dielectric function in the required range of the spectrum may be used. For example, Al, Au, Ag and Cu may be used for optical radiation. The thickness of the ground layer and active layer may be selected appropriately. In one embodiment, the thickness is 150 nm.

The dielectric layer may be formed from any insulating material that can transmit the radiation to be filtered, e.g. the dielectric layer may be transparent to transmit optical radiation. In one embodiment, the dielectric material is $SiO_2$. The advantage of $SiO_2$ is that it is effective as part of an MM absorber and is transparent to optical radiation. The dielectric material may have a thickness of 3 µm. This thickness may be suited for an absorption frequency around 2 THz, e.g. 2.15 THz or 1.93 THz. Thinner insulating layers may be required above 1.93 THz while thicker layers may be required below 1.93 THz.

The device may comprise multiple filters. For example, the properties of the surface discontinuities across the surface plasmon supporting layer may vary to provide a plurality of filter sub-regions with different filter properties, i.e. sensitivity to different wavelengths. For example, where the surface plasmon layer is the ground layer, the ground layer may comprise an array of optical filter regions, each optical filter region being associated with a respective period and/or diameter of holes fabricated on the ground layer. In one embodiment, the device may provide an array of sixteen sub-regions, each acting an optical filter for a distinct optical wavelength (or narrow band of wavelengths). The size of each sub-region may be 1 mm×1 mm, and the size of the array may be 5 mm×5 mm. It can therefore be understood that each sub-region comprises many hybrid cells. The presence of the active layer in each hybrid cell thus has no effect on the transmission of optical radiation other than an expected decrease in transmission intensity. Modification of the active layer may ensure that this effect is minimised and possibly eliminated.

By selection of appropriate parameters for the MM absorber and the surface discontinuities, one embodiment of the second aspect of the invention may thus provide a metamaterial (MM) absorber with a plasmonic filter set to create a multispectral material that absorbs at 1.93 THz and filters sixteen discrete colours. This material could be integrated with CMOS technology to create a system capable of both colour imaging and terahertz imaging.

BRIEF DESCRIPTION OF THE DRAWINGS

Examples of aspects of invention discussed above are described in detail below with reference to the accompanying drawings, in which.

DETAILED DESCRIPTION; FURTHER OPTIONS AND PREFERENCES

Terahertz Radiation Detector

Figure 1:
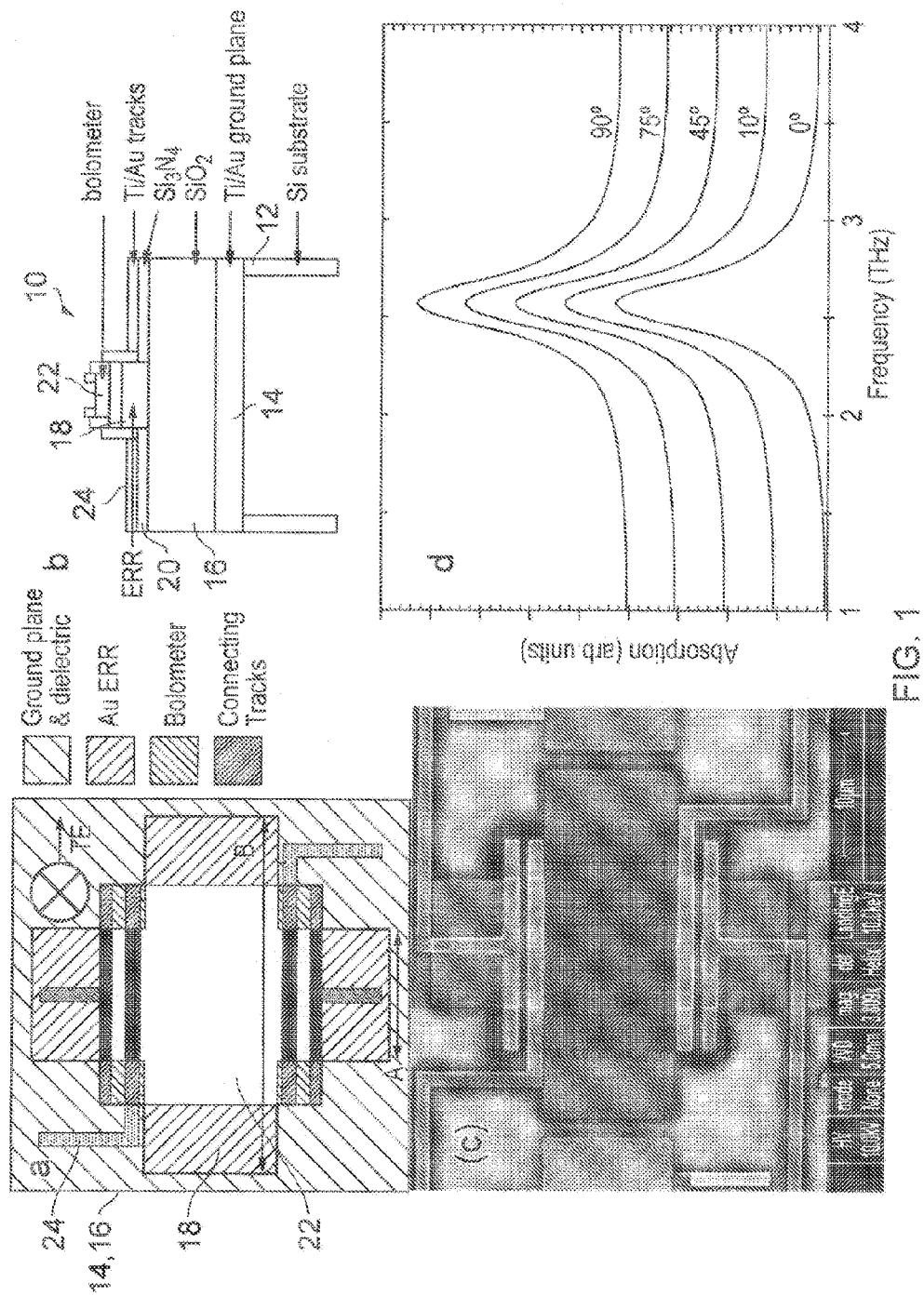
FIG. 1 is a schematic diagram of a monolithic resonant terahertz detector that is an embodiment of the invention in which (a) shows a plan view of an individual unit cell, (b) shows a cross-sectional view thereof, (c) shows a scanning electron microscope image of the fabricated device, and (d) shows an absorption spectra for different incident polarization angles showing polarization insensitivity of the metamaterial absorber (without the micro-bolometer)

Plan and cross-sectional diagrams of a single unit cell 10 of a monolithic resonant THz detector that is an embodiment of the invention are shown in FIG. 1a and FIG. 1b respectively. An SEM micrograph of a fabricated device is shown in FIG. 1c.

As shown in FIG. 1b, the unit cell 10 comprises (in ascending order) a silicon substrate 12, an electrically conductive Ti/Au ground layer 14, a SiO2 dielectric layer 16, an electrically conductive Au active layer 18 having a cross-shape when viewed from above, an electrically insulating $Si_3N_4$ layer 20, a heat sensitive vanadium oxide layer 22, and conductive Ti/Au tracks 24 connected to the heat sensitive vanadium oxide layer 22. The silicon substrate 12 is illustrated with a window 26 to represent the intended input membrane of the detector.

The geometric parameters of the device are as follows: A=10 µm; B=27 µm; ground plane and ERR thickness=150 nm; $SiO_2$ thickness=3 µm; $Si_3N_4$ thickness=50 nm; Ti/Au connecting track thickness=200 nm; track width=1 µm and vanadium oxide micro-bolometer thickness=100 nm.

The unit cell 10 is suited to arrangement in a periodic manner (period=30 µm) to form individual pixel sensors in a focal plane array that is also an embodiment of the invention. The array may comprise 350×350 pixel sensors covering an area of 10.5 mm×10.5 mm.

Electron beam lithography was used as the work horse to fabricate the detector, on account of its versatility and excellent registration capability. The metamaterial absorber 14, 16, 18 is fabricated on top of the silicon substrate 12 and consists of a continuous metallic ground plane 14 separated from a patterned cross shaped metallic structure 18 by a 3 µm thick layer of $SiO_2$ 16. The cross-shaped structure 18 is an example of an electric ring resonator (ERR) and couples strongly to uniform electric fields, but negligibly to a magnetic field. By pairing the ERR with a ground plane, the magnetic component of the incident THz wave induces anti-parallel currents in the ERR and ground plane [19]. The electric and magnetic response can be tuned independently and the impedance of the structure matched to free space by varying the geometry of the ERR and the distance between the two metallic elements. To maximize the absorption magnitude the impedance ($Z=\sqrt{\mu_r/\epsilon_r}$) of the MM structure must be matched to that of free space i.e. Z=1. Single band, dual band and broadband absorbers have been demonstrated across the THz frequency range [18-21].

The optimised MM absorber structure was designed using 3D finite difference time domain (FDTD) simulations (Lumerical Inc.). Our absorber design, because of its inherent symmetry, is polarization insensitive. FIG. 1d shows simulated absorption spectra for different incident polarization angles showing polarization insensitivity of the metamaterial absorber (without the micro-bolometer). Each successive plot from 0-90° is offset by one major unit of the ordinate axis for clarity. In this representation 0°=TE and 90°=TM. Simulations show that the absorption spectra are similar for radiation impinging on the device at angles of less than 80° from the normal. At increasing angles the magnetic response of the resonator decreases and the absorption magnitude drops.

A 50 nm $Si_3N_4$ layer 20 separates the MM absorber 14, 16, 18 from the vanadium oxide resistive micro-bolometer. The 100 nm thick vanadium oxide (VOx) film 22 was deposited at room temperature using RF reactive sputtering of vanadium metal in an oxygen environment.

The Ti/Au connecting tracks 24 and bond pads are added using conventional techniques.

Figure 2:
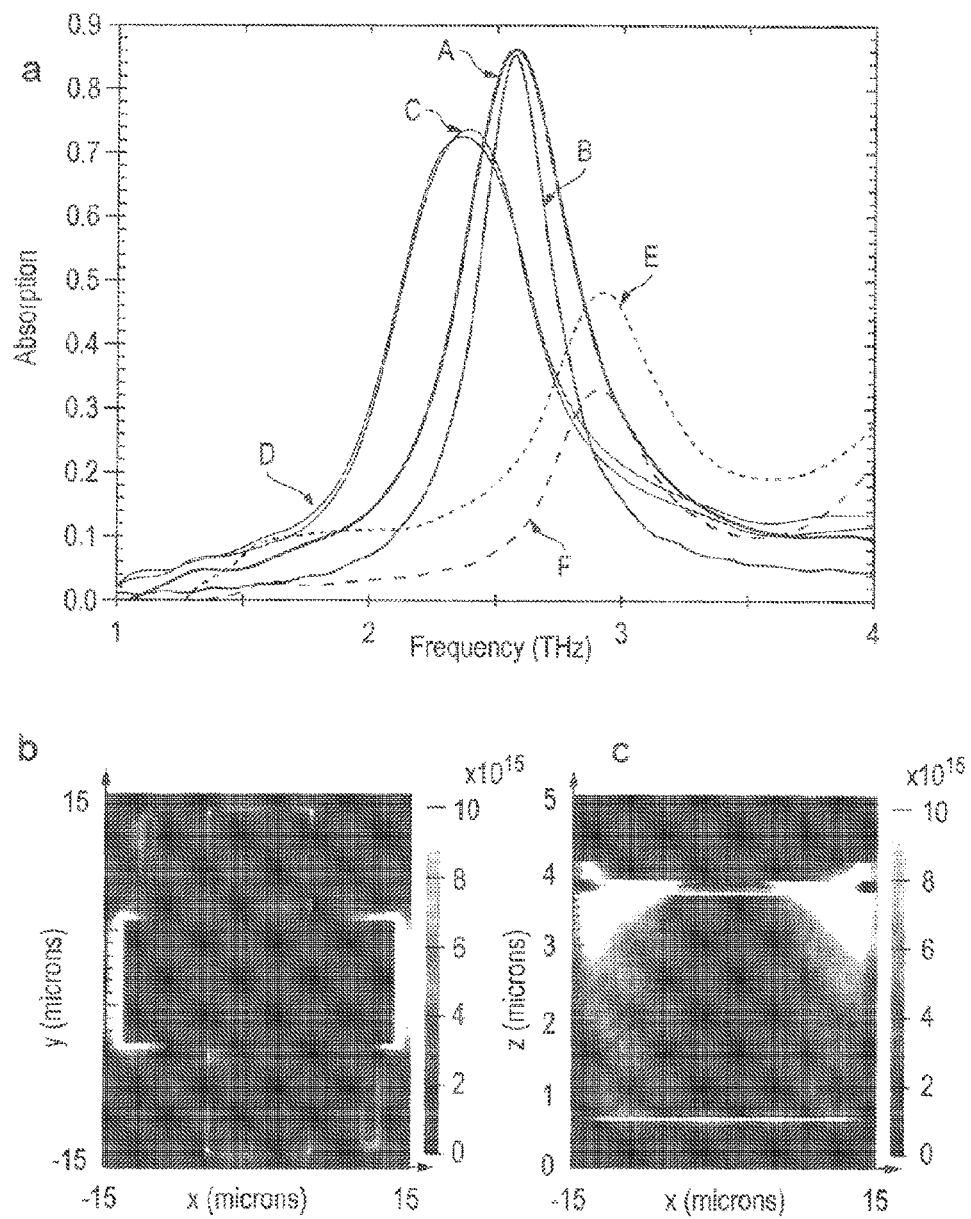
FIG. 2 shows simulated and experimental absorption spectra for the monolithic resonant terahertz detector shown in FIG. 1.
Figure 3:
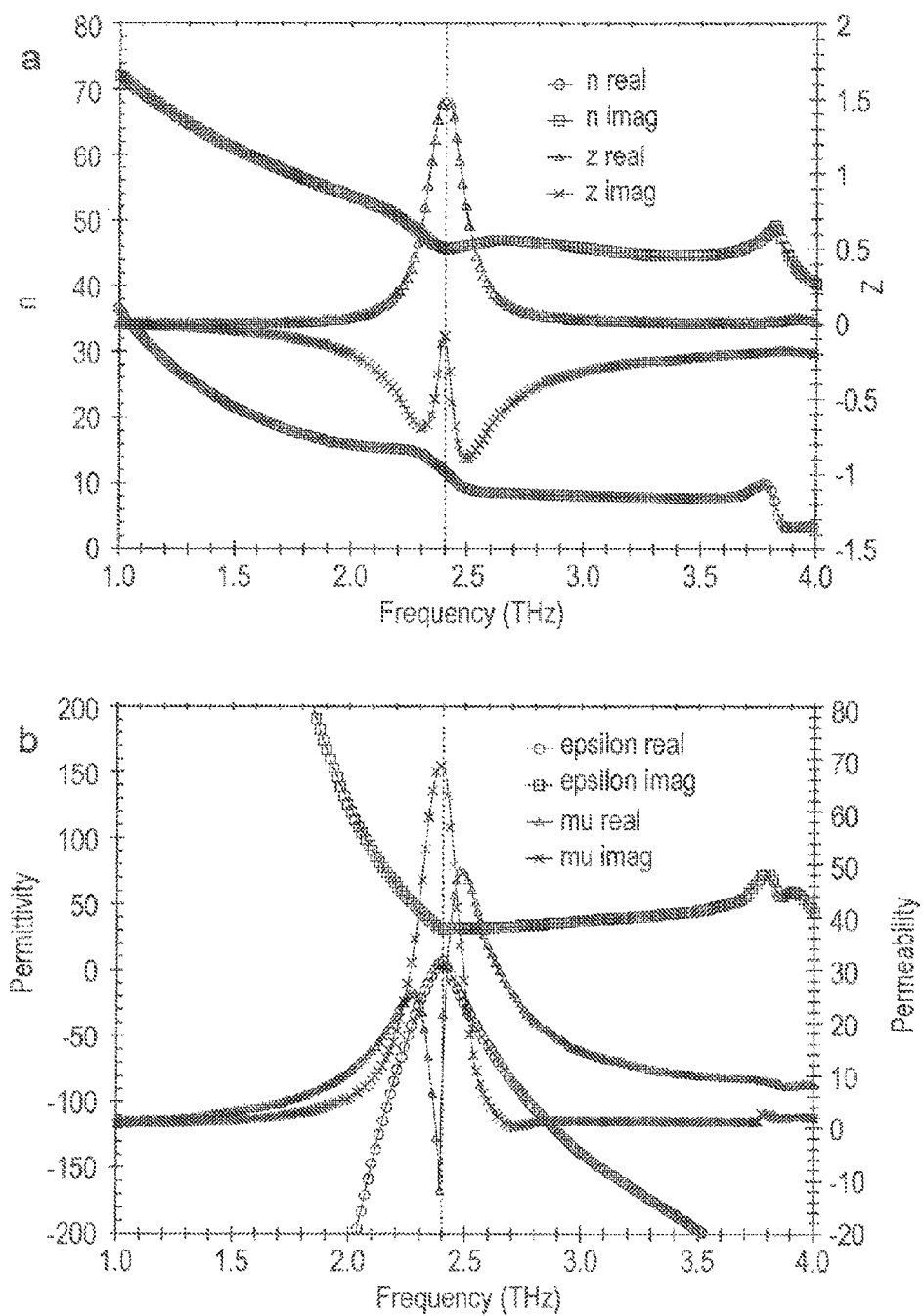
FIG. 3 shows extracted parameters for the simulated monolithic resonant THz detector including the bolometer, in which (a) shows refractive index and wave impedance and (b) shows permittivity and permeability.
Figure 4:
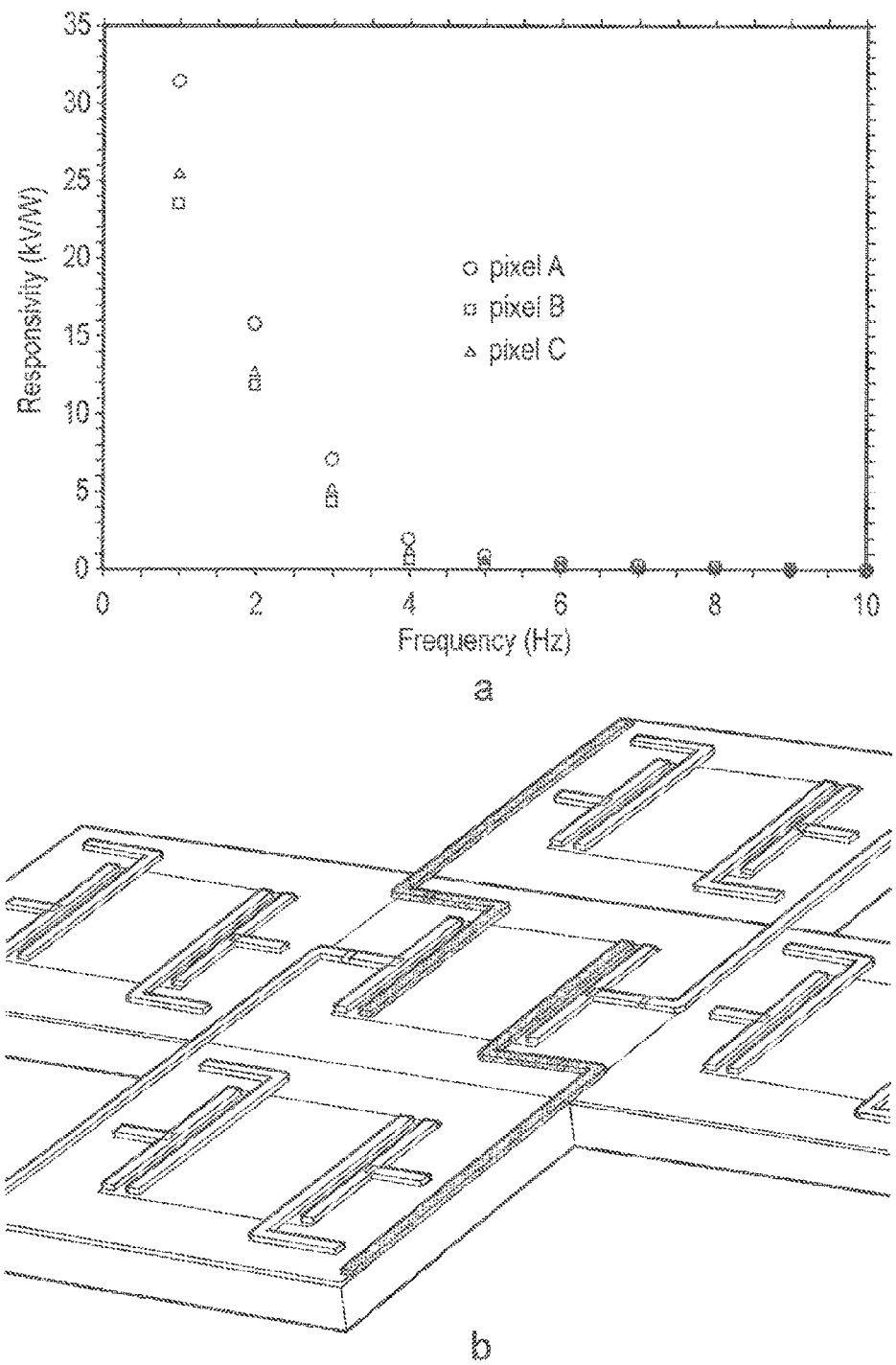
FIG. 4 shows the performance of the monolithic resonant THz detector shown in FIG. 1 without isolation regions, in which (a) shows a plot of experimental responsivity versus chopper modulation frequency and (b) shows a 3D COMSOL simulation result of the temperature gradient of the resonant THz detector after 2 s when 40.1 µW is incident on the central pixel.
Figure 5:
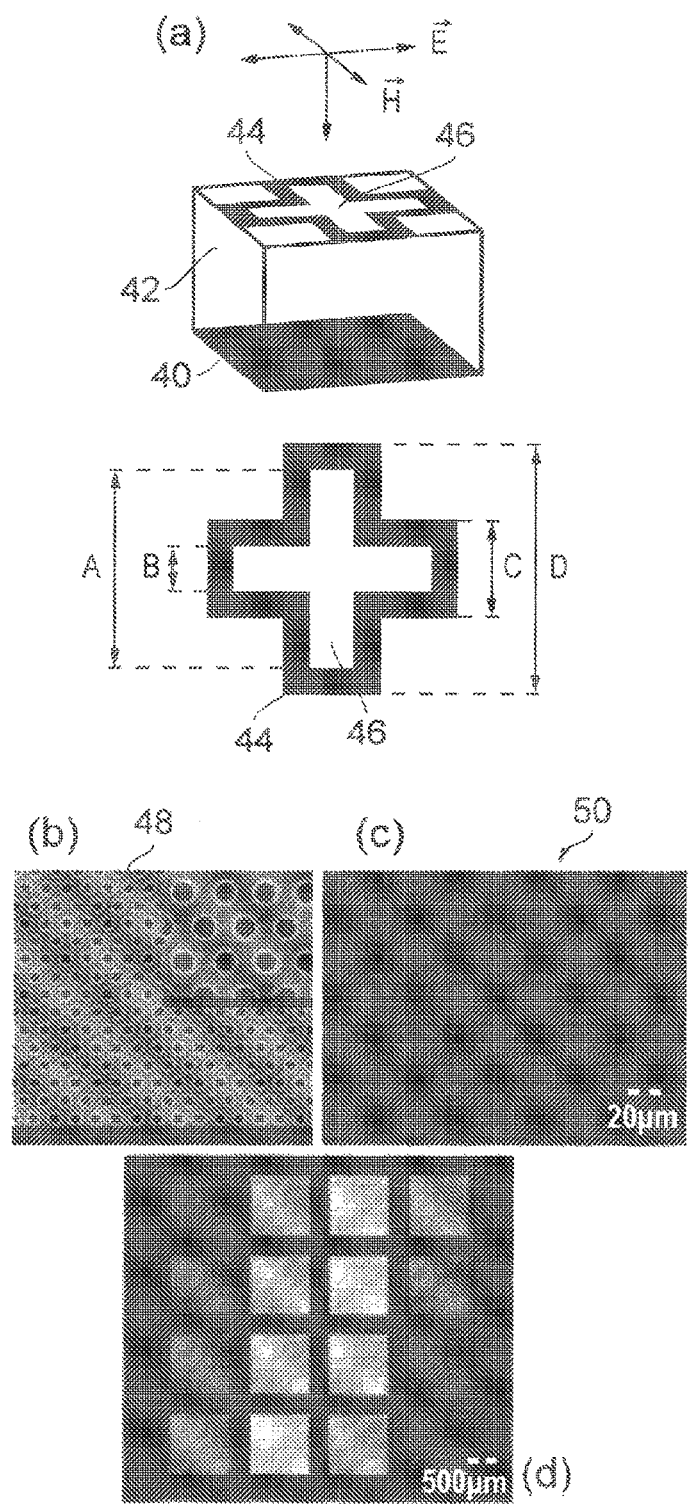
FIG. 5 depicts various design and microscope images for the combined plasmonic filter and metamaterial absorber, in which (a) shows schematic illustrations of a unit cell and ERR showing field directions and dimensions, (b) shows SEM images of the ground plane having a red (hole period 430 nm) triangular filter array, (c) shows a transmission microscope image of a red filter (hole period 410 nm) region of the ground plane with ERR layer above, and (d) shows a transmission microscope image of a multi-filter array built from the unit cells.
Figure 6:
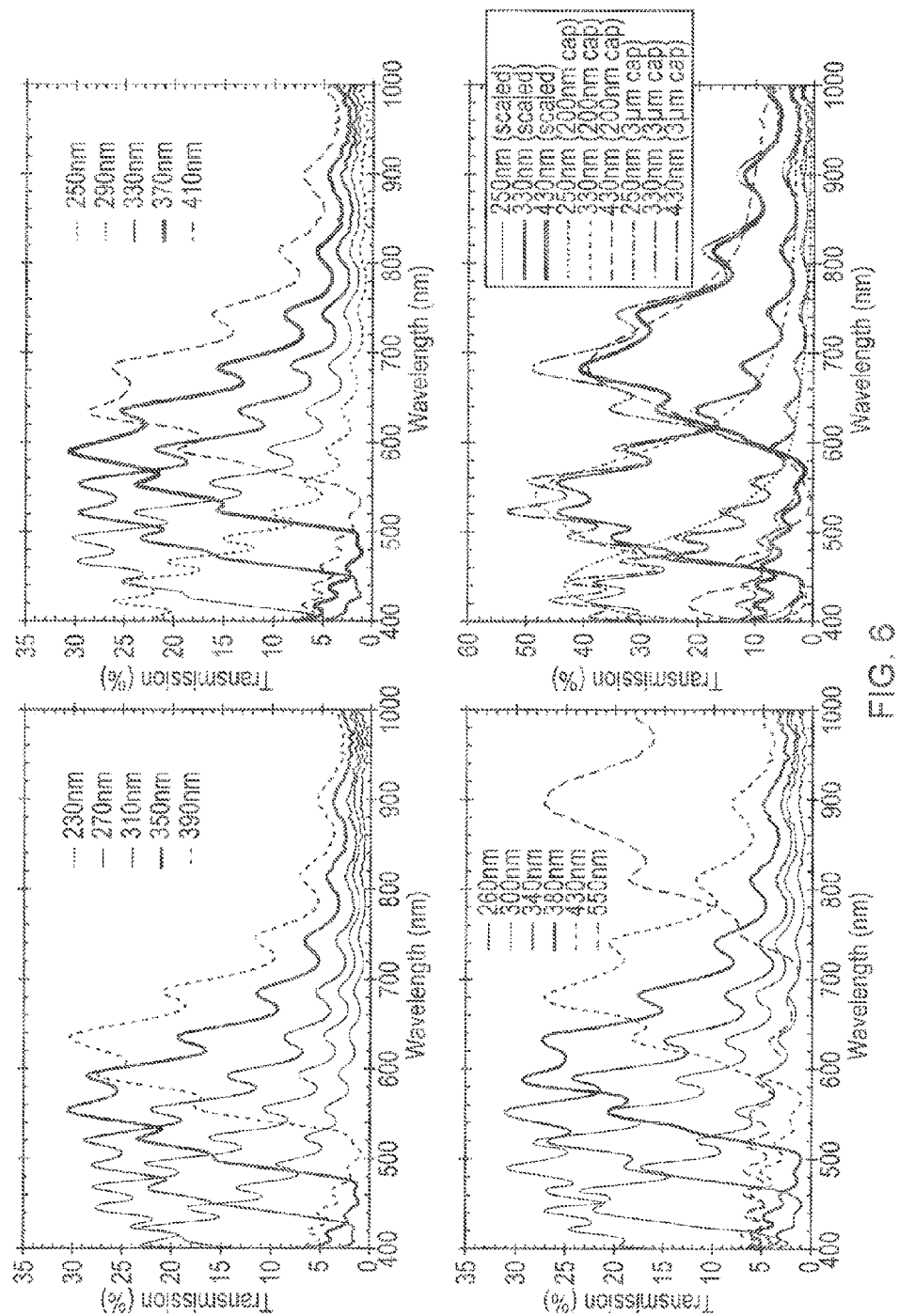
FIG. 6 shows transmission spectra of the multi-filter array shown in FIG. 5.

Further properties of the device are discussed with reference to FIGS. 2 to 4.

The absorption spectra of the completed devices was assessed using a Bruker IFS 66v/S Fourier Transform Infrared Spectrometer as described in the Methods section. FIG. 2a shows the experimental and simulated absorption spectra for the MM absorber structure only (no micro-bolometer on top). The graph in FIG. 2a compares experimental data for the MM absorber only (line A), FDTD simulation data for the absorber only (line B), experimental spectrum of complete detector for TE polarization (line C), experimental spectrum of complete detector for TM polarization (line D), experimental spectrum of complete detector with no ERR for TE polarization (line E0, and experimental spectrum of complete detector with no ERR for TM polarization (line F). There is good agreement between the experimental data and numerical simulations with both spectra showing a single resonant absorption peak of 85% magnitude at 2.57 THz. As can be seen in FIG. 2a, the addition of the $Si_3N_4$, the VOx micro-bolometer and associated connecting tracks shifts the resonance frequency to 2.4 THz and reduces the peak absorption magnitude to 72%. However there is still greater than 60% absorption at 2.52 THz. Moreover there is a broadening of the resonance peak, reducing the Q value from 4.6 to 3.5. In order to confirm that the absorption response is a direct consequence of the metamaterial structure, devices were fabricated with no ERR. The absorption spectra of these devices, for TE and TM modes, are plotted in FIG. 2a (lines E and F) and show a small resonance, attributed to the metal tracks that connect the micro-bolometer, at 2.9 THz but no resonance at 2.4 THz.

To understand the origin of the spectral characteristics, the simulated absorption distributions in the x-y plane at the top of the ERR and in the x-z plane at y=5 µm at the resonance frequency of 2.4 THz are plotted in FIG. 2b and FIG. 2c respectively. The x-y absorption plot reveals that the regions of maximum absorption occur in the gap between adjacent crosses suggesting that the resonance is an electric dipole in nature. As shown in FIG. 2c, the THz radiation is mainly absorbed in a 1 µm thick region of $SiO_2$ below the ERR layer confirming that any thermal sensing element, such as a micro-bolometer, should be positioned directly above the ERR.

To examine the nature of the resonant absorption, the effective permittivity and permeability of the metamaterial structure were extracted from the simulated data via inversion of the scattering parameters [22]. The refractive index, n, and the impedance, Z, are found using the following equations:

$$n = \frac{1}{kd}\cos^{-1}\left[\frac{1}{2S_{21}}(1 - S_{11}^2 - S_{21}^2)\right] \quad (1)$$

$$Z = \sqrt{\frac{(1+S_{11}^2)^2 - S_{21}^2}{(1-S_{11}^2)^2 - S_{21}^2}} \quad (2)$$

where d is the thickness of the metamaterial structure and S11 and S21 are the scattering parameters. The permittivity and permeability can subsequently be found using the relations:

$$\epsilon_r = \frac{n}{z}, \mu_r = nZ \qquad (3)$$

The retrieved n, Z, $\epsilon_r$ and $\mu_r$ are displayed in FIG. 3a and FIG. 3b, where the vertical dashed lines denote the resonance frequency position. As can be observed in FIG. 3a, the real part of the impedance peaks at the resonance frequency, implying large absorption, while in FIG. 3b the real parts of the optical constants cross near zero—a condition required for zero reflection [23]. In addition, whenever the real part of the permittivity is positive the real part of the permeability is negative (and vice versa)—a condition required for near zero transmission [23].

The detector was glued to a custom designed chip carrier and subsequently wire bonded. Three pixels were connected via lead out tracks to bond pads for experimental characterization. To establish the temperature coefficient of resistance (TCR), an environmental chamber in conjunction with a Keithley 4200 was used to evaluate the micro-bolometer resistance using a four terminal measurement at temperatures between 5° C. and 70° C. At 20° C. the measured average TCR is −2.01%/K and the average micro-bolometer resistance is 8.1 MΩ.

The two most commonly used figures of merit for FPA detectors are the responsivity and thermal time constant. The responsivity can be expressed using the following relation [24]:

$$R_V = \frac{\alpha \eta R I_B}{G_{th}\sqrt{1+\omega^2\tau^2}} \qquad (4)$$

where $\alpha$ is the temperature coefficient of resistance, $\eta$ is the absorption magnitude, R is the resistance of the micro-bolometer, $I_B$ is the bias current, $G_{th}$ is the thermal conductance, $\omega$ is the angular chopping modulation frequency and $\tau$ is the thermal time constant. The thermal time constant is obtained by fitting the responsivity as a function of modulation frequency.

The responsivity and thermal time constant of the THz detector were evaluated using the experimental set-up described in the Methods section. FIG. 4a shows the measured responsivity of three single pixel detectors with respect to chopper frequency from 1 to 10 Hz measured at atmospheric pressure for a bias current of 1 µA. The average extracted thermal time constant is 1.02 s and the average DC responsivity is 118 kV/W. The average DC responsivity value compares favourably to values of current state of the art THz detectors that operate at room temperature such as Schottky diodes [25] and pyroelectric devices [26] however the extracted thermal time constant is two orders of magnitude larger than that of typical micro-bolometer elements (~10 ms). COMSOL multiphysics finite element simulations reveal that this large thermal time constant is a consequence of poor thermal isolation of the active pixel. FIG. 4b shows the simulated temperature increase after 2 seconds when 40.1 µW is incident on the central pixel. All 4 adjacent pixels experience the same temperature increase as the central pixel revealing significant thermal cross talk and lack of thermal isolation. Thermal isolation of each pixel can be attained by removing sections of the $Si_3N_4$, $SiO_2$ and Ti/Au ground plane at pixel boundaries. In one embodiment, this is achieved by removing a 2 µm wide frame around the perimeter of the pixel, following which a wet or plasma etching technique can be used to remove the $Si_3N_4$, $SiO_2$ and Ti/Au layers. These results, demonstrating the feasibility of integrating a metamaterial absorber with a micro-bolometer sensor, represent a significant milestone in the proliferation of metamaterial devices into practical applications. Our unique approach to detecting terahertz radiation and the inherent scalability to large array formats is a significant advance toward compact, low-cost and real-time terahertz imaging systems.

The methods used to assessed the spectral characteristics and measure the responsivity and thermal time constant are outlined briefly below.

1. Spectral Characterization

The absorption spectra of the completed devices were assessed using a Bruker IFS 66v/S Fourier Transform Infrared Spectrometer in transmission mode at normal incidence and in reflection mode at 30° incidence. A wire-grid polarizer fabricated on a high density polyethylene substrate [27] was used to ensure only linearly polarized light emanating from the Hg arc lamp was incident on the device. The measured transmission spectra were normalized with respect to the signal measured from a 4 mm diameter open aperture and the reflection spectra were normalized to that of a gold mirror. The resultant absorption, A, was therefore calculated using $A(\omega)=1-R(\omega)-T(\omega)$ where R is the reflection and T the transmission. As the thickness of the ground plane is much larger than the typical skin depth in the THz regime, the transmission across the frequency range of interest is negligibly small and therefore the reflection is the only factor limiting absorption.

2. Responsivity and Thermal Time Constant Measurements

A $CO_2$ pumped methanol vapour laser source (Edinburgh Instruments) operating at 2.52 THz with a maximum output power of 150 mW was used as the THz source. The emanating beam was a 15 mm circular spot with a uniform power density across its diameter. A poly 4 methyl pentene-1 (TPX) lens with a focal length of 54 mm focused the incident beam down to a diameter of ~1 mm. The beam shape at the focus position was measured using a commercial IR FPA (FLIR) and is shown in FIG. 3(b). A Scientech AC2500 power meter was used to measure the power at the focus and was found to be 35 mW giving the total power incident on each pixel as 40.1 µW, assuming a uniform power distribution. The THz detector was mounted on an x-y-z stage and positioned at the focus point. A mechanical chopper (Thor Labs) was placed in front of the TPX lens in order to modulate the THz beam. The micro-bolometer was DC current biased using a Keithley 4200 at 1 µA and the voltage signal picked up by a lock-in amplifier (EG&G Model 5210). The DC response was measured using the SMUs available on the Keithley 4200. For all responsivity measurements a Kelvin 4 point probe set-up was used to negate the resistance of the connecting tracks and therefore evaluate the true voltage drop across the bolometer.

Filter/Absorber Hybrid

The fabrication, simulation and characterization of a multispectral material that is an embodiment of the second aspect of the invention is discussed below with reference to FIGS. 5 to 9. The discussion demonstrates the independence of the metamaterial and plasmonic responses with respect to each other.

1. Combined Absorber and Filter: Design and Fabrication

The combined device is based on existing absorber and filter designs, but with relevant structural and compositional parameters altered to ensure that each optical response can occur whilst having minimal impact on the other. The structure is shown schematically in FIG. 5. It is effectively a modified form of the metamaterial absorber structure discussed above, which comprises an electrically conductive ground layer 40, a dielectric layer 42 and a cross-shaped electrically conductive active layer 44. The modification causes the structure to display SPR at visible wavelengths. In this embodiment, the active layer 44 forms a hollowed out metal cross, i.e. a cross shape with an internal cut out 46, which acts as an electric ring resonator (ERR) to couple to the incident electric field [49, 50]. Magnetic coupling is provided by the inclusion of the ground plane 40 (formed of aluminium in this embodiment), separated from the ERR 44 by a dielectric layer 42, and is observed as anti-parallel currents on the metal surfaces [19, 34]. Plasmonic filtering is provided by a triangular array of holes 48 fabricated onto aluminium as demonstrated by Chen et. al [40]. and Inoue at. Al [41]. A triangular array shows a large gap between adjacent transmission peaks when compared to a square array and is therefore preferential for imaging applications [37, 39, 40].

A periodic array 50 of the combined device may be used to create an optical filter, as shown in FIG. 5c. A plurality of different optical filters can be fabricated in a single device, as shown in FIG. 5d.

The absorber performance is most greatly impacted by changing the thickness or material of the dielectric layer [19], or by altering the ERR shape [50, 51]. The plasmonic filters are strongly affected by metal thickness, type and the hole array pattern [37, 39, 40]. These features allow us a certain degree of freedom in designing and optimising a combined device.

A unit cell of the combined device is shown in FIG. 5a. By ensuring the ground plane is sufficiently thin, it can be patterned with a triangular hole array to also act as a plasmonic filter. By patterning the aluminium film with nanoholes of different sizes and periods across the MM array, multiple colour filters can be made and combined with the absorber. The dimensions of the ERR are as follows: A=20 µm, B=5 µm, C=10 µm, D=26 µm.

The first step in fabricating the combined device was to evaporate a 150 nm aluminium film on to a clean glass substrate. Aluminium was used due to its low cost, ease of fabrication and CMOS compatibility. Plasmonic filters patterned in 150 nm of aluminium demonstrate high transmission and narrow full width half maximum (FWHM) [40, 41]. Contrastingly, the absorber properties are largely independent of metal type and thickness. The skin depth of aluminium is approximately 80 nm and demonstrates low transmission at terahertz frequencies [52, 53], therefore a 150 nm film is a suitable ground plane for the MM absorber.

The hole array was patterned on to the ground plane using electron beam lithography (EBL). 50 nm of silicon nitride was deposited on to the aluminium to assist with resist adhesion. ZEP520A was spin coated on to the silicon nitride surface and holes were defined in the electron beam resist using a Vistec VB6 EBL tool. The pattern was developed using o-xylene, and the silicon nitride and aluminium holes were etched using trifluoromethane/oxygen ($CHF_3/O_2$) in a Plasmalab 80 Plus dry etch tool and silicon tetrachloride ($SiCl_4$) in a Plasmalab System 100 dry etch tool, respectively. The remaining resist and silicon nitride were removed and the sample was cleaned.

At this stage, a scanning electron microscope (SEM) was used to investigate the quality of the etched holes and to measure their diameter. A SEM image of the nanoholes formed for a red filter is shown in FIG. 5b.

The hole array was patterned in a manner to form a plurality of optical filters corresponding to sub-regions of the ground layer, as shown in FIG. 5d. Each filter was 1 mm×1 mm in size and was separated by 0.33 mm from the next adjacent filter. The sixteen filters extended to a square area of 5 mm×5 mm.

The dielectric layer thickness and material is significant in defining the overall response of both the MM absorber and the plasmonic filters. In a study by Grant et. al. it is demonstrated that a 3.1 µm layer of HD Microsystems PI2545 polyimide gives the highest absorption out of the range of dielectric thicknesses and materials tested for this absorber design [19]. However, it is important to optimise the plasmonic response by ensuring that the dielectric is the same on both sides of the aluminium and that the holes are fully covered [40]. Also, transmission measurements on HD Microsystems PI2545 polyimide demonstrated that it does not transmit uniformly over the whole visible spectral range and is therefore fundamentally unsuitable in the fabrication of colour filters. Silicon dioxide is transparent over the whole visible range and MM absorbers using silicon dioxide have been shown to exhibit high absorption.

A 200 nm layer of silicon dioxide was deposited onto the aluminium surface using plasma enhanced chemical vapour deposition. This layer was sufficiently thick to completely fill the holes and cover the aluminium and therefore the filtering response was maximised. Transmission spectra of all colour filters were measured with the 200 nm silicon dioxide cap layer to compare with the subsequent measurements of the combined device and simulation results. A 2.8 µm layer of silicon dioxide was then deposited onto to the device. The 3 µm of silicon dioxide acted as the cap layer for the plasmonic filters and as the dielectric spacer in the metamaterial absorber. Further transmission spectra measurements were recorded at this stage.

The ERR array was fabricated by spin coating a bilayer of poly(methyl methacrylate) (PMMA) on to the silicon dioxide surface. The ERR layer was patterned using EBL and isopropyl alcohol: methyl isobutyl ketone (IPA: MIBK) was used to remove the exposed resist. A 150 nm layer of aluminium was deposited on top of the device and hot acetone was used to remove the remaining resist and unwanted aluminium. The ERR array patterned above the plasmonic filters covered an area of 12 mm×12 mm. A single filter is shown in FIG. 5c and the entire filter array is shown in FIG. 5d. It should be noted that in FIG. 5d the ERR layer is present however cannot be seen clearly due to the low magnification and is only detectable as a drop in the intensity of the transmitted light.

2. Experimental Characterisation

The transmitted colours of the plasmonic filters can be seen clearly by eye. The ERR structure results in decreased transmission of filtered light, however by careful positioning of the filters and alteration of the ERR structure, this effect can be minimised and for many applications, such as digital imaging, can likely be eliminated.

The transmission spectrum from each of the filters was measured with a TFProbe MSP300 microspectrophotometer. Unpolarized white light from a halogen lamp was transmitted through the sample and collected by a camera with a detector spot size of 100 µm. The largest spot size was used in conjunction with the microscope lowest magnification lens. This is an essential requirement of plasmonic filter transmission measurements as it is necessary to limit the range of angles being measured. Plasmonic filters respond to variation in angle by displaying a redshift in the peak wavelength position and decrease in magnitude in the observed transmission spectra. The lowest magnification lens has the lowest numerical aperture and therefore allows light transmission from the smallest range of angles, which is closest to the desired normal incidence measurement. A white light background spectrum was taken as reference measurement.

The measured transmission spectra for the sixteen colour filters on the combined device are shown in FIG. 6a-c. The legend in the graphs denotes hole period. Fabry-Perot oscillations are present in the filter transmission spectra. The oscillation peaks are described by:

$$\lambda_N = \frac{2dn}{N}$$

where $\lambda_N$ is the Nth peak, N is an integer, d is the length of the cavity and n is the refractive index of the cavity material [54]. Using equation (1) and treating the resonator as a 3 µm cavity of silicon dioxide with n=1.48, yields the oscillation peak positions as observed.

The position of the plasmonic filters with respect to the ERRs is such that in the relevant, visible spectral range, the plasmonic interaction with the incident light is sufficiently far away to not be influenced by the ERRs. There is also no visible light resonant response associated with the ERRs due to their large size relative to the wavelength of visible light. Therefore, the largest contributor to the transmission spectra magnitude decrease, when compared with standalone filters, is the drop in intensity of visible light due to the reflection of incident light by the ERRs. It was essential to use the largest detector spot size such that the influence of the ERRs on transmission was effectively averaged over and merely appeared as an intensity drop in the resultant spectra. Consideration of the geometry of the ERRs yields the conclusion that the surface is covered by 33.6% of metal, which will result in a uniform drop in light intensity of 33.6% over the visible light range. This means that the measured spectra represent only 66.4% of the of the true filter spectra. In CMOS applications the plasmonic filters would be on the order of a few microns [48]. The smaller filter size could result in the effect of the ERRs being neglected entirely. In order to observe this, the measured spectra for blue, green and red filters were scaled up accordingly, to account for the presence of the ERRs as shown in FIG. 6d. FIG. 6d compares RGB filters with a 200 nm cap layer, RGB filters with a 3 µm cap layer and RGB filters on a completed device with 3 µm cap layer and ERR layer. The combined device filter measurements are scaled with respect to the drop in transmission due to the ERR layer. It is observed that the scaled spectra are now within approximately 10% of the spectra measured for the filters with a 3 µm cap layer, thereby demonstrating the independence of the ERRs on the SPR action of the ground plane.

Characterization of the MM absorber capabilities of the combined device were performed using a Bruker IFS 66v/S Fourier transform infrared spectrometer (FTIR). The sample was illuminated by a mercury arc lamp with a 4 mm source aperture and the transmission spectra at normal incidence, $T(\omega)$, and reflection spectra at 30°, $R(\omega)$, were measured. The transmission spectra were normalised to a 10 mm open aperture and the reflection spectra were normalised to a gold mirror through a 10 mm aperture. Using this data the absorption spectrum was calculated using $A(\omega)=1-R(\omega)-T(\omega)$.

Figure 7:
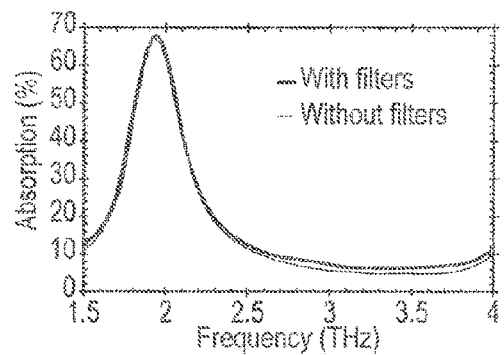
FIG. 7 illustrates an experimental evaluation of the THz absorption properties of the multi-filter array shown in FIG. 5 using FTIR spectroscopy.
Figure 8:
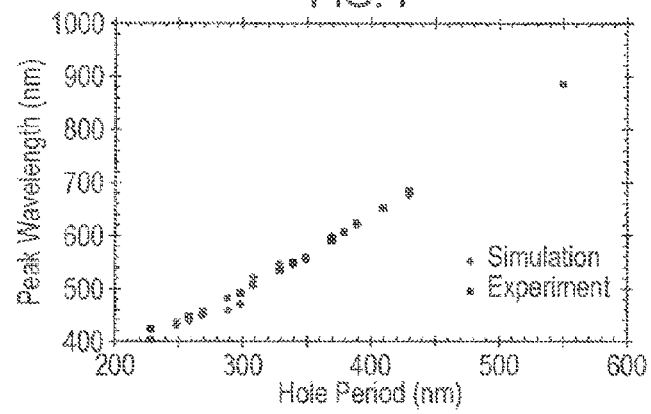
FIG. 8 shows a comparison of plasmonic filter with 200 nm cap layer with experimentally measured transmission spectra and corresponding simulation results.
Figure 8:
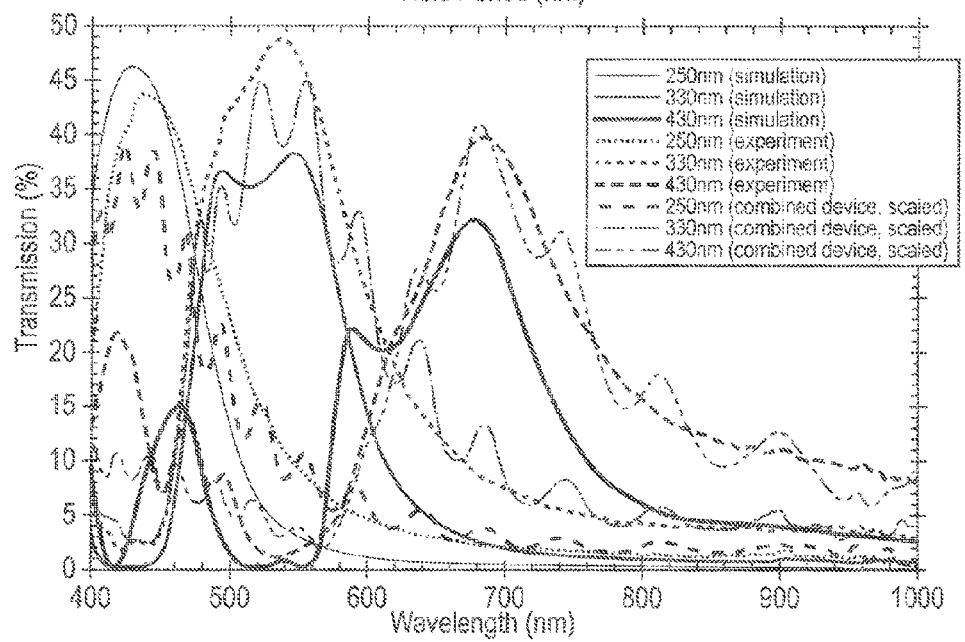
Figure 9:
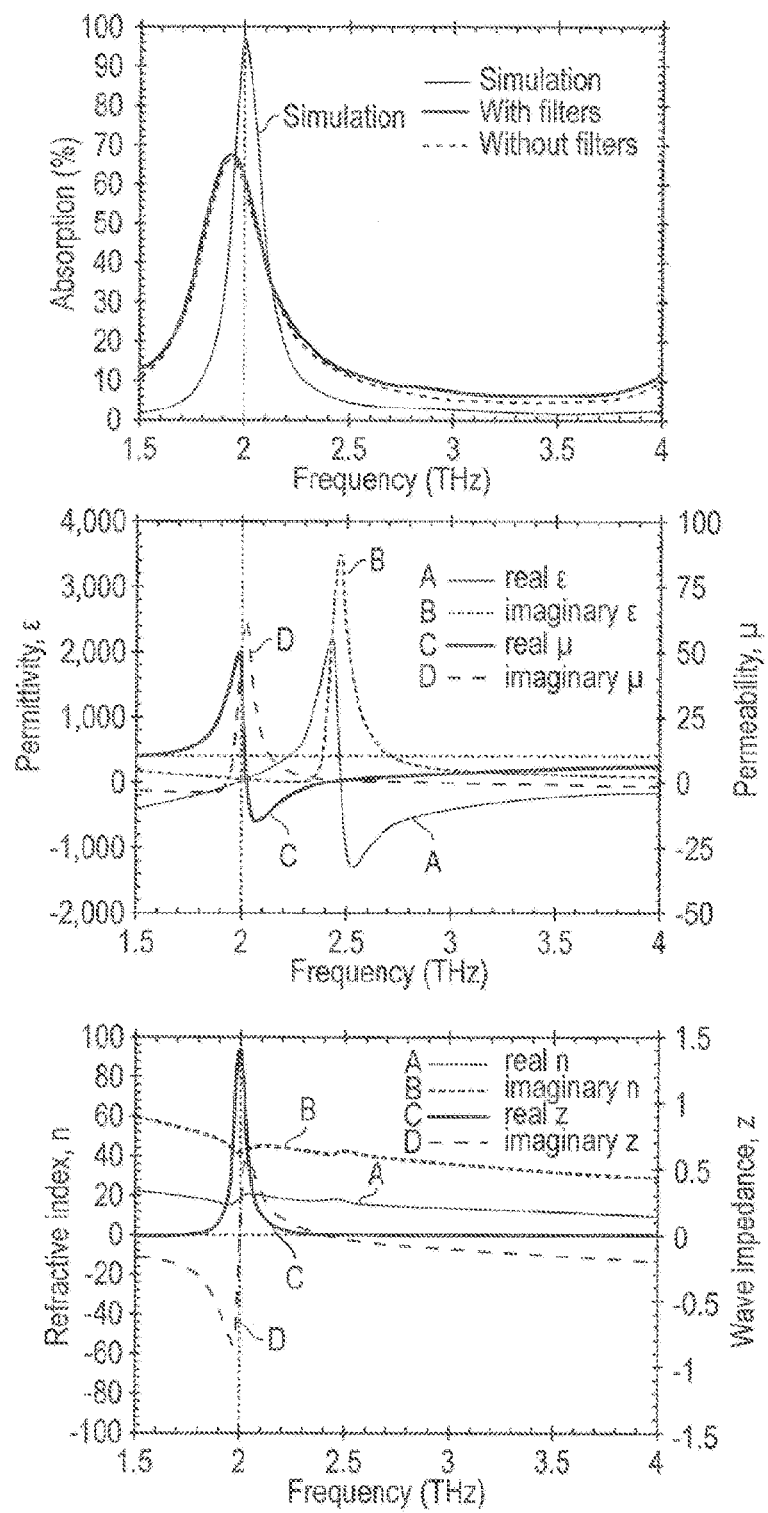
FIG. 9 shows metamaterial absorber simulation results and extracted effective parameters.

The experimental result for the combined device is shown in FIG. 7. The absorption spectrum for the same MM absorber design, without plasmonic filters on the ground plane, is shown for comparison. Both absorbers exhibit absorption peaks of approximately 67% at 1.93 THz and have similar spectral profiles, thereby demonstrating that the presence of plasmonic filters have a negligible effect on the performance of the absorber.

3. Simulation and Theoretical Description of Device

The device was optimised and the underlying physical processes were analysed using Lumerical finite difference time domain (FDTD) solutions. A 3D simulation model was used throughout to investigate the behaviour of the combined design in both visible and terahertz wavelength regimes. The wavelength of radiation in the terahertz region and the size of the ERRs are much greater than that of the wavelength of visible light, meaning that to include the sub-wavelength plasmonic holes in the total simulated structure was found to be particularly memory intensive and therefore unfeasible.

To overcome this problem, an investigation into how the presence of nanoholes in an aluminium film affects the transmission and reflection from incident terahertz radiation was carried out. The aluminium model used was from refractive index parameters listed in Rakić [55]. An aluminium film patterned with a square-lattice hole array, between a semi-infinite air superstrate and a semi-infinite air substrate was modelled. The aluminium was placed on the x-y plane and a plane wave source was incident parallel to the z axis from above. A uniform mesh with maximum cell sizes $\Delta x=\Delta y=\Delta z=5$ nm were used to ensure the hole and metal thickness were clearly defined. Anti-symmetric and symmetric boundary conditions were used in x and y, respectively to form a periodic square lattice hole array and to optimise simulation time. The z boundaries used perfectly matched layers. The aluminium film was centred on z=0 and was illuminated by a plane wave source ranging from 1 THz to 9 THz placed at z=150.075 µm. Transmission and reflection monitors were placed at z=−300.075 µm and z=300.075 µm, respectively. The hole diameter was 140 nm and the array period was 250 nm.

Aluminium thicknesses ranging from 50 nm to 200 nm were measured with and without holes using the previously described method. It was observed that for all simulations, the majority of terahertz radiation was reflected, as expected. The transmission does not exceed $2.1 \times 10^{-6}$ in this frequency range, therefore, it is reasonable to describe the aluminium and hole array at terahertz frequencies as an optically thick metal film without perforations.

These measurements were repeated for a triangular array of blue and infrared filters with periods of 230 nm and 550 nm, respectively and hole diameters of 130 nm and 290 nm, respectively. These parameters correspond to the smallest and largest filter hole arrays used on the combined device and transmission is still observed to be of the order of $10^{-6}$. Therefore, treating the colour filters and absorber independently is a reasonable way to characterise the whole device.

Simulations were run to evaluate the performance of a set of standalone plasmonic filters. Lumerical's default material database holds "Palik" aluminium and silicon dioxide models that were used to characterise the constituent materials of the filters [56]. A 150 nm aluminium film was placed in the x-y plane, a semi-infinite silicon dioxide superstrate was placed above the metal and a 200 nm silicon dioxide cap layer was positioned below the aluminium. The aluminium was patterned with a triangular array of 150 nm deep silicon dioxide cylinders and the glass cap layer was patterned with corresponding 150 nm air cylinders, to account for the aluminium resulting in a non-uniform cap layer in fabrication. The period of the hole arrays were varied for each of the sixteen filters to yield discrete wavelength filtering. The hole sizes used in the simulations were determined by using SEM images of the fabricated filter arrays that had been taken before the 200 nm silicon dioxide cap layer was placed on top of the metal surface. Period is well known across the filter surface and is simulated as was fabricated, however subtle differences in fabrication can result in variation of fabricated hole size compared with the intended hole size to be patterned with EBL. Therefore, it is essential to measure the fabricated hole size for the purpose of characterization simulations. The array period, intended hole size and measured hole size are listed in Table 1.

TABLE 1

Plasmonic filter array period and average hole size. Table of measured hole size for each period. Also listed is the intended hole size for fabrication. Measured hole size was used in plasmonic filter simulations.

| Period (nm) | Target hole diameter (nm) | Measured hole diameter (nm) |
| --- | --- | --- |
| 550 | 290 | 294 |
| 430 | 230 | 233.5 |
| 410 | 220 | 225 |
| 390 | 210 | 208.3 |
| 380 | 205 | 207.6 |
| 370 | 200 | 206.2 |
| 350 | 190 | 194.5 |
| 340 | 185 | 179.5 |
| 330 | 180 | 180.4 |
| 310 | 170 | 174.2 |
| 300 | 165 | 173.7 |
| 290 | 160 | 166.2 |
| 270 | 150 | 156.5 |
| 260 | 145 | 147.3 |
| 250 | 140 | 143.3 |
| 230 | 130 | 130.3 |

A plane wave source ranging from 400 nm to 1 μm was perpendicularly incident on the top surface of the aluminium film. A transmission monitor was positioned at a distance of 800 nm from the silicon dioxide cap layer. Anti-symmetric and symmetric boundary conditions were used in x and y such that the required periodic triangular hole array was formed. Perfectly matched layers were used as boundary conditions in z. $\Delta x = \Delta y = \Delta z = 5$ nm mesh parameters were again used to define the maximum mesh step to ensure the filter structures were clearly represented. This is similar to the simulation method used by Chen et. al. [44].

The peak wavelength of the normal incidence transmission spectra for a triangular hole array can be approximated by the following dispersion relation:

$$\lambda_{max} = \frac{a}{\sqrt{\frac{4}{3}(i^2 + ij + j^2)}} \sqrt{\frac{\varepsilon_m \varepsilon_d}{\varepsilon_m + \varepsilon_d}}$$

where $\lambda_{max}$ is the resonant wavelength, a is the period of the hole array, $\in_m$ and $\in_d$ are the complex permittivities of the metal and dielectric, respectively, and i and j are the scattering orders [37, 39]. As can be seen from equation (2), varying the period results in a linear variation of peak wavelength. This observed in the plasmonic filter transmission spectra.

FIG. 8a shows a comparison of simulated peak wavelength with experimentally measured peak wavelength for sixteen plasmonic filters with a 200 nm cap layer. FIG. 8b shows the simulated transmission spectra for RGB plasmonic filters with a 200 nm cap layer. Also displayed are the experimental results for filters with a 200 nm cap layer, a 3 μm cap layer and the combined device, with 3 μm cap layer and ERR array. The combined device spectra are scaled with respect to the drop in intensity due to the ERR layer. The legend denotes hole period.

MM absorbers are typically described in terms of their complex effective electromagnetic parameters, namely the refractive index, $n_{eff}$, the wave impedance, $z_{eff}$, the electric permittivity, $\in_{eff}$, and the magnetic permeability, $\mu_{eff}$. At resonance, absorption is maximised by matching the wave impedance of the metamaterial to the wave impedance of free space, thereby eliminating reflections, and also by ensuring that the extinction coefficient, imaginary (n), is large [34, 57, 58].

The effective electromagnetic parameters are calculated using scattering parameters determined by simulations, and the following equations:

$$n_{eff} = \frac{1}{kd} \cos^{-1}\left[\frac{1}{2S_{21}}(1 - S_{11}^2 + S_{21}^2)\right]$$

$$z_{eff} = \sqrt{\frac{(1 + S_{11})^2 - S_{21}^2}{(1 - S_{11})^2 - S_{21}^2}}$$

$$\varepsilon_{eff} = \frac{n_{eff}}{z_{eff}}$$

$$\mu_{eff} = n_{eff} z_{eff}$$

where k is the wavenumber of the incident light, d is the thickness of the MM absorber and S21 and S11 are the complex transmission and reflection scattering parameters, respectively, after having been corrected for the phase shift that is observed due to the propagation length of the plane wave [59]. It should be noted that we evaluate the effective parameters of the MM absorber as a homogeneous media, however this is not the case and the effective parameters described only apply when the radiation is incident perpendicularly on to the ERR surface of the absorber [59].

The MM absorber structure was simulated as a means of extracting the scattering parameters required to calculate the effective parameters. The refractive index data for aluminium in the paper by Rakić [55] was used in conjunction with the silicon dioxide Palik [56] model to describe the metamaterial component materials in the terahertz regime. A 150 nm aluminium ground plane and 3 μm silicon dioxide dielectric spacer were positioned in the x-y plane. A 150 nm aluminium ERR structure was placed above the dielectric layer, thereby forming the unit cell as seen in FIG. 5a. The ERR dimensions are as listed previously. A modified version of the Lumerical FDTD Solutions' S parameter extraction analysis script was used to simulate the absorber model. Transmission and reflection monitors were placed at 65.85 μm and 70.85 μm from the absorber, respectively. Refractive index monitors were also used at these positions as this data was required to carry out phase correction on the scattering parameters. A terahertz plane wave source was incident perpendicularly onto the ERR surface, with the orientation seen in the unit cell image in FIG. 5a. The unit cell was repeated by using anti-symmetric and symmetric boundary conditions in x and y, respectively, and perfectly matched layers were used in z. The maximum mesh steps through the absorber were $\Delta x=\Delta y=200$ nm and $\Delta z=50$ nm.

FIG. 9a shows the simulated absorption spectra, calculated using $A(\omega)=1-R(\omega)-T(\omega)$. The simulated absorption peaks at 2.01 THz with a magnitude of 97%. This peak is narrower, larger and slightly blue shifted when compared with the observed experimental results which show peaks at 1.93 THz with magnitudes of approximately 67%. These minor inconsistencies are likely due to fabrication imperfections and subtly different material parameters between the silicon dioxide and aluminium that have been fabricated and simulated.

The calculated effective parameters are displayed in FIG. 9b-c.

Multi-Spectral Metamaterial Absorber

To date, many publications demonstrate multi-spectral MM absorption [20, 69, 70] but the multiple absorption bands occur in only one region of the electromagnetic spectrum.

In contrast, another aspect of the present invention may provide a multi-spectral metamaterial absorber (MSMMA) that has absorption bands in distinct regions of the electromagnetic spectrum, e.g. the mid IR range (~4 µm) and the THz range (e.g. around 2.9 THz).

A MSMMA according to this aspect of the invention can be integrated with a micro-bolometer sensor as discussed above to result in a co-axial THz and IR sensor that can maximise the spectral information acquired per unit area and can be scaled to FPA formats to yield a THz and IR image. The two images could be overlaid to provide a more revealing and data rich visualization of the target object. Such image fusion techniques permit discrepancies to be identified and comparative processing to be performed [71, 72].

Figure 10:
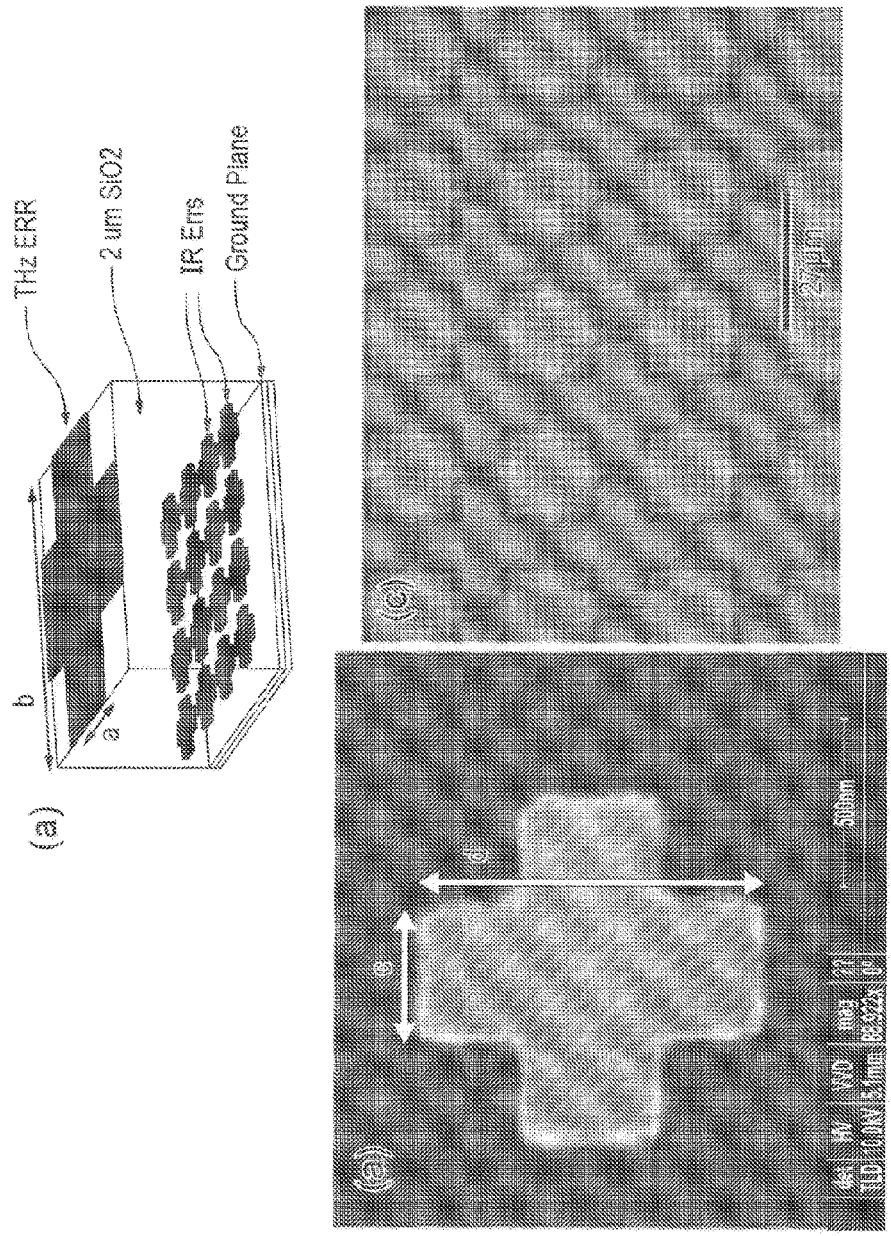
FIG. 10 depicts various design and microscope images for a multispectral metamaterial absorber (MSMMA) that is another embodiment of the invention, in which (a) shows a 3D schematic of the MSMMA (not to scale), (b) shows a scanning electron microscope image of a single IR ERR, and (c) shows an optical microscope image of the MSMMA.

FIG. 10(a) depicts a schematic view of a single unit cell of an MSMMA that is an embodiment of the invention. It consists of a typical THz single band MM absorber, based on the design discussed above, into which is embedded (within the $SiO_2$ dielectric layer) an array of metallic crosses that, along with a continuous ground plane, form the IR absorber. In each single THz unit cell there are 15 sub-unit IR cells. The unit cell period is 30 µm while the sub-unit cell period is 2 µm. The metallic cross-shaped structures are examples of an electric ring resonator (ERR) and couple strongly to uniform electric fields, but negligibly to a magnetic field. By pairing the ERR with a ground plane, the magnetic component of the incident wave induces a current in the sections of the ERR that are parallel to the direction of the E-field. An anti-parallel image current also flows in the region of the ground plane immediately below the cross that results in a resonant response. The electric and magnetic response can then be tuned independently and the impedance of the structure matched to free space by varying the geometry of the ERR and the distance between the two metallic elements. The ERR determines the electric response while the insulator type and thickness between the ERR and the ground plane determines the magnetic response. In practical terms, the cross arm length dominates the resonance frequency peak position while the insulating layer thickness and refractive index properties dictate the absorption magnitude. The optimum insulator layer thickness to attain high absorption between the ERR and the ground plane scales with frequency.

In this embodiment, the $SiO_2$ thickness between the IR ERR and the ground plane is 50 nm and between the THz ERR and ground plane is 2.05 µm. Table 2 lists the other geometric parameters, labelled in FIG. 10(a) and FIG. 10(b), of the MSMMA.

TABLE 2

| Geometric parameters of the MSMMA | | | | |
|---|---|---|---|---|
| Parameter | a | b | c | d |
| Value (µm) | 10 | 27 | 0.4 | 0.8 |

Finite difference time domain (FDTD) simulations can be performed to determine the optimum geometry for the MSMMA. A 3D simulation model may be used to investigate the behaviour of the MSMMA in the mid IR (3-10 µm) and terahertz (1.5-4 THz) wavelength regimes. The 3D simulations performed herein used a plane wave source incident in the z direction on the multi-layer unit cell and with perfectly matched layer boundary conditions. Taking advantage of the inherent symmetry of the structure and to reduce computation demands, anti-symmetric and symmetric boundary conditions were used in the x and y directions respectively. A uniform mesh was used in the region around the metal with maximum mesh cell sizes of $\Delta x=\Delta y=\Delta z=5$ nm. Such a small mesh is necessary to adequately discretize the IR ERRs. In the IR region the metallic regions (ERRs and ground plane) were modelled using the default Au Palik refractive index data available in Lumerical material database [56]. In the THz range, no Palik data was available; instead a frequency independent conductivity of $4\times 10^7$ $Sm^{-1}$ was used. For both the IR and THz regions Palik data was used for the $SiO_2$ insulating layer. Reflection and transmission spectra were recorded at planes 100 µm above and 100 µm below the top THz ERR.

Once the optimum MSMMA design is established, standard metal evaporation, plasma deposition and e-beam lithography techniques can be used to fabricate devices. First a 20/130 nm Ti/Au metallic ground plane is evaporated onto a 15×15 mm silicon substrate. A 50 nm thick layer of $SiO_2$ is then deposited by plasma enhanced chemical vapour deposition (PECVD). The IR ERR layer, spanning an area of 12 mm×12 mm, is defined in a bi-layer of PMMA e-beam resist using a Vistec VB6 e-beam tool and a 20/130 nm film of Ti/Au evaporated and lifted off in hot acetone. A further 2 µm of PECVD $SiO_2$ was deposited on top of the IR ERR layer and finally the THz ERR layer was again defined using electron-beam lithography in a bi-layer of PMMA, a 20/130 nm Ti/Au layer evaporated and lifted-off in hot acetone. A scanning electron microscope (SEM) image of a single IR ERR is shown in FIG. 10(b) while an optical image of the fully fabricated MSMMA is shown in FIG. 10(c). In addition, a sample with no IRR ERR layer was fabricated in parallel in order to determine the IR spectral characteristics of a standard THz absorber.

Samples manufactured according to the above technique were characterized under vacuum in a Bruker IFS 66v/S Fourier Transform Infrared Spectrometer in reflection mode at 30° incidence. For the IR region, the reflection and transmission measurements were performed using a SiC globar source, KBr beamsplitter and a deuterated, L-alaninedoped triglycine sulfate (DLaTGS) pyroelectric detector. THz measurements required the use of a Hg source, a Mylar beamsplitter and a DLaTGS detector with a polyethylene window. The measured reflection spectra were normalized to that of a gold mirror. Since the Ti/Au ground plane thickness is greater than the skin depth at THz frequencies and above (1 THz~75 nm) there is negligible transmission through the MSMMA therefore the absorption characteristics can be determined directly from the reflection measurements. The resulting absorption, A, was therefore calculated using $A(\omega)=1-R(\omega)$ where R is the reflection.

Figure 11:
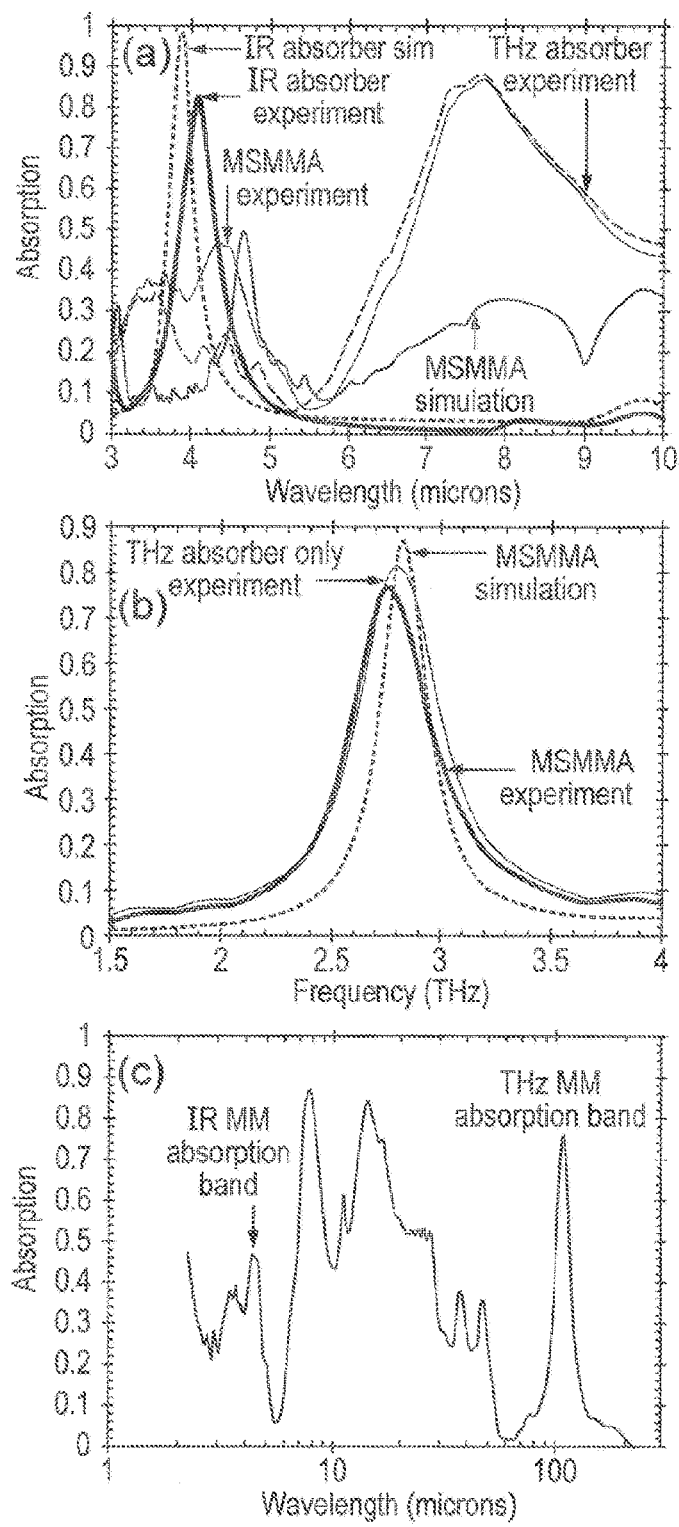
FIG. 11 shows experimental and simulated data relating to absorption properties of the MSMMA shown in FIG. 10, in which (a) shows experimental and simulated finite difference time domain (FDTD) data of a stand alone IR absorber, THz absorber and MSMMA in the IR region (3-10 µm), (b) shows experimental and simulated FDTD spectral characteristics of a stand alone THz absorber and MSMMA in the terahertz region (1.5-4 THz), and (c) shows experimental spectral absorption of the MSMMA from 2.2 to 212 µm (136-1.4 THz)

FIG. 11(a) shows FDTD simulation and experimental data for a standalone MM IR absorber consisting of a ground plane, 50 nm $SiO_2$ layer and metallic IR ERRs. The geometric dimensions of the IR ERRs are identical to that of used in the MSMMA (see Table 2). The experimental spectrum has an absorption peak of 83% magnitude at a wavelength of 4.09 μm. In comparison, the simulated spectrum yields an absorption magnitude of 98% at 3.89 μm implying good agreement between the simulation and experimental data. Also shown in FIG. 11(a) is the IR spectral response of a standalone THz absorber. There are a series of small absorption peaks below 5 μm and a large, more prominent, broad, absorption peak present at 7.7 μm. The absorption mechanism for the peak at 7.7 μm is attributed to classical dielectric loss, as it is well known that the absorption coefficient of $SiO_2$ increases markedly from 6-8 μm [56]. Significantly, there is only 20% absorption at 4.09 μm. The experimental absorption spectrum of the MSMMA, shown in FIG. 11(a), has two major peaks. In addition to the peak at 7.7 μm there is a second peak with a maximum absorption magnitude of 47% at 4.3 μm. Again, this experimental data compares favourably with the simulated characteristics which exhibit a major absorption peak at 4.63 μm of 49% magnitude and confirms that this peak is a direct consequence IR MM absorber layer embedded in the MSMMA.

For the 1.5-4 THz range the experimental absorption spectrum of the MSMMA is shown in FIG. 11(b). An absorption magnitude of 77% is attained at the resonance frequency of 2.78 THz. As evident from FIG. 11(b), good agreement is obtained between the experimental and simulated absorption spectra. There is also little difference in the experimental absorption characteristics of the standalone THz MM absorber and the MSMAA. FIG. 11(c) shows the absorption spectrum for the MSMMA from 2.2 to 212 μm and reveals numerous absorption peaks. The two peaks attributed to MM based absorption are labelled accordingly.

Figure 12:
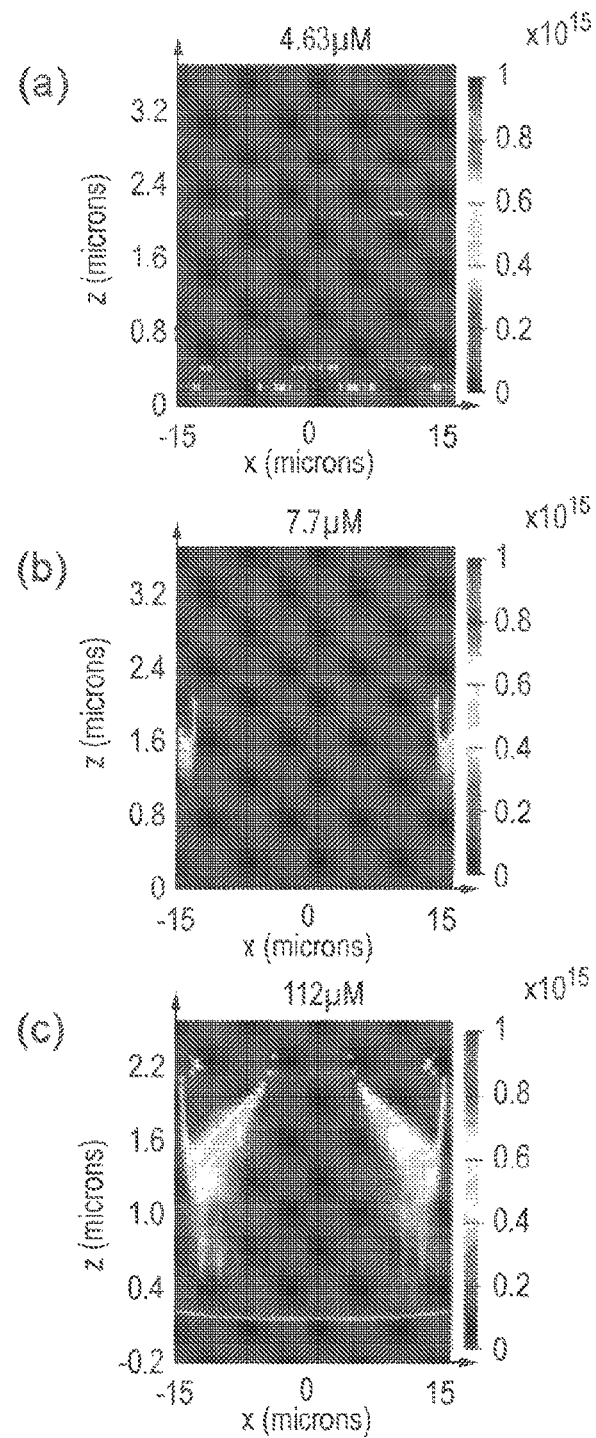
FIG. 12 shows a simulated FDTD absorption distribution in the xz plane of the MSMMA shown in FIG. 10 at three major absorption peaks of (a) 4.63 µm, (b) 7.7 µm and (c) 112 µm.

To confirm the origin of the three major absorption peaks associated with the MSMMA, the absorption distribution in the xz plane was simulated using Lumerical FDTD. FIG. 12 shows the simulated absorption distribution in the xz plane for the three major absorption peaks of the MSMMA. The top of the ground plane is at z=0.2 μm, the bottom of the IR ERR is at z=0.25 μm and the bottom of the THz ERR layer is at z=2.25 μm. For the absorption peak at 4.64 μm the energy is mainly absorbed in the metal and insulating layers that comprise the IR MM absorber. In contrast, at 7.7 μm the majority of the energy is absorbed in the first 800 nm of the $SiO_2$ beneath the THz ERR and there is negligible contribution from the IR MM absorber structure. As can be clearly seen in FIG. 12(c), at 112 μm, the absorption occurs in the THz ERR metallic layer and first few hundred microns of $SiO_2$ supports the hypothesis that the THz MM absorber is responsible for this absorption band.

Numerous possibilities exist with the MSMMA to tune the absorption bands to any desired frequency. For example, another embodiment of the MSMMA may be constructed with the same layer thicknesses and materials as discussed above, but with two exceptions to the IR MM absorber component: (1) the IR ERR cross arm length is 1.6 μm as opposed to 0.8 μm and (2) the $SiO_2$ thickness between the ground plane and the IR ERRs is 100 nm instead of 50 nm.

Figure 13:
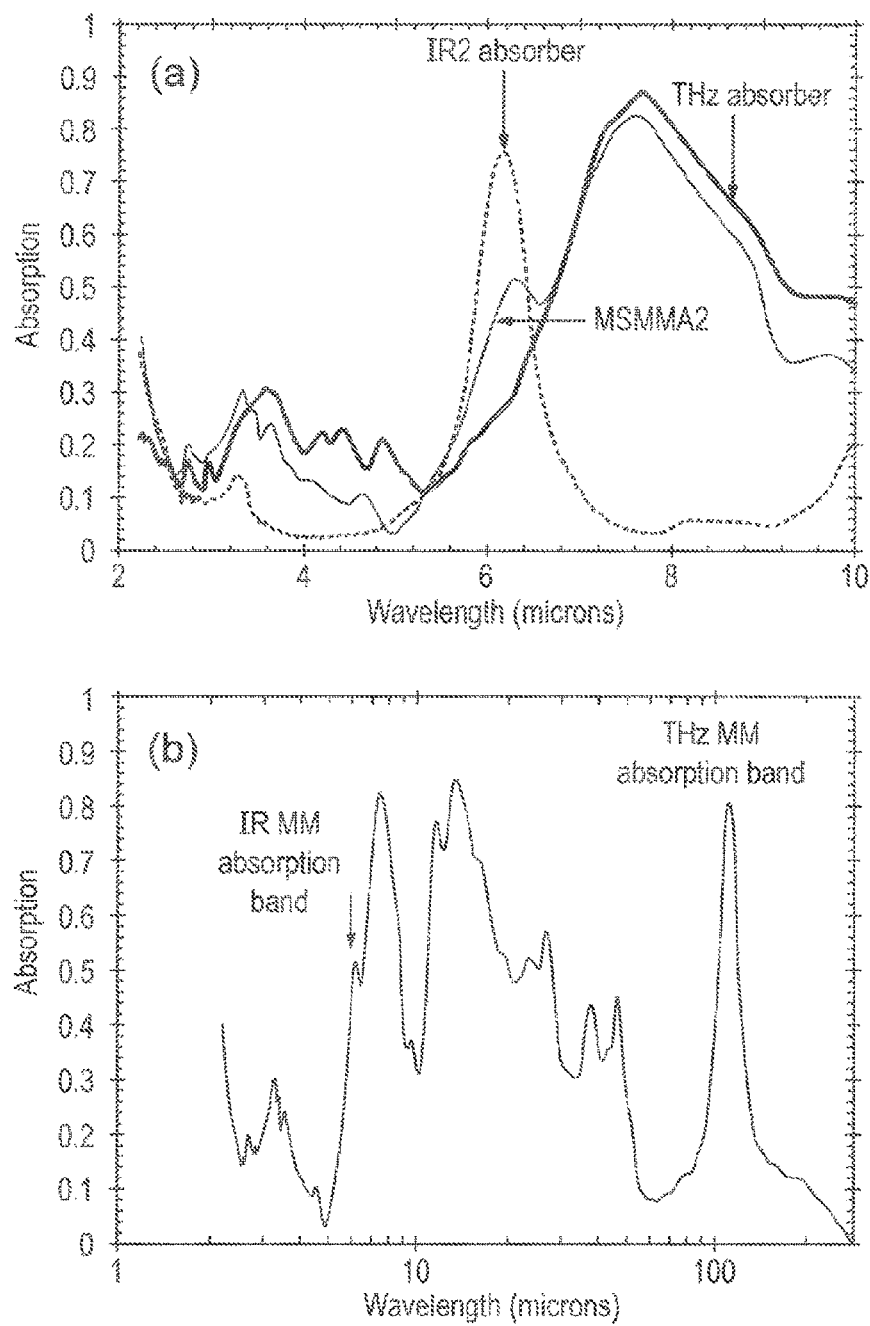
FIG. 13 shows experimental spectral absorption characteristics of another embodiment of an MSMMA, in (a) the 2-10 µm wavelength range, and (b) the 2.2 to 240 µm wavelength range.

It is well known that increasing the cross arm length and fixing the period of the structure results in a red shift of the resonance frequency while in order to attain high absorption the insulating layer thickness between the ground plane and ERR layer must increase with increasing wavelength. The spectral absorption properties of the standalone IR absorber, labelled as IR2, are shown in FIG. 13(a). An absorption magnitude of 75% is obtained at 6.1 μm. For the combined IR and THz MM absorber device, labelled as MSMMA2, the IR absorption peak magnitude drops to 52% and the frequency peak position red shifts to 6.28 μm. The full absorption spectrum from 2.2 to 240 μm can be seen in FIG. 13(b). Modifying the IR ERR structure has no effect on the absorption magnitude (77%) and frequency peak position (112 μm) of the THz MM absorber compared with the device shown in FIG. 10.

In summary, we have simulated, fabricated and characterised a multi-spectral metamaterial absorber. The MSMMA has experimental absorption peaks at 4.3 μm and 112 μm of magnitude 47% and 77% respectively and the results are corroborated via FDTD simulations. A natural application in which such a device could be used is multi-spectral imaging. The periodic nature of MM structures lends itself to forming arrays. If a sensor, such as a microbolometer, were to be coupled with the MSMMA then a multi-wavelength focal plane array can be realised. Such an imaging device could render images at two distinct wavelengths in the IR and THz e.g. 4.3 μm, and 112 μm. Image fusion, the process of combining relevant information from two or more images into a single image, would render a resulting image that is more informative and data rich than either of the individual input images.

REFERENCES

[1] Woodward, R. M. et al. Terahertz pulse imaging of ex vivo basal cell carcinoma. J Invest Dermatol 120, 72-78 (2003).
[2] Baker, C. et al. Detection of Concealed Explosives at a Distance Using Terahertz Technology. Proceedings of the IEEE 95, 1559-1565, doi:10.1109/jproc.2007.900329 (2007).
[3] Kawase, K., Ogawa, Y., Watanabe, Y. & Inoue, H. Non-destructive terahertz imaging of illicit drugs using spectral fingerprints. Opt Express 11, 2549-2554 (2003).
[4] Federici, J. & Moeller, L. Review of terahertz and subterahertz wireless communications. J Appl Phys 107, doi:Artn 111101, doi:10.1063/1.3386413 (2010).
[5] Dobroiu, A., Sasaki, Y., Shibuya, T., Otani, C. & Kawase, K. THz-wave spectroscopy applied to the detection of illicit drugs in mail. Proceedings of the IEEE 95, 1566-1575, doi:10.1109/jproc.2007.898840 (2007).
[6] Strachan, C. J. et al. Using terahertz pulsed spectroscopy to quantify pharmaceutical polymorphism and crystallinity. J Pharm Sci-Us 94, 837-846, doi:10.1002/jps.20281 (2005).
[7] Dobroiu, A. et al. Terahertz Imaging System Based on a Backward-Wave Oscillator. Appl. Opt. 43, 5637-5646 (2004).
[8] Siegel, P. H., Smith, R. P., Gaidis, M. C. & Martin, S. C. 2.5-THz GaAs monolithic membrane-diode mixer. Ieee T Microw Theory 47, 596-604 (1999).
[9] Lisauskas, A. et al. Terahertz imaging with GaAs field-effect transistors. Electron Lett 44, 408-409, doi:10.1049/E1:20080172 (2008).

[10] Lisauskas, A., Boppel, S., Krozer, V. & Roskos, H. G. Silicon CMOS-Based THz Detection. 2011 Ieee Sensors, 55-58 (2011).

[11] Lee, A. W. M., Williams, B. S., Kumar, S., Hu, Q. & Reno, J. L. Real-time imaging using a 4.3-THz quantum cascade laser and a 320×240 microbolometer focal-plane array. Ieee Photonic Tech L 18, 1415-1417, doi:10.1109/Lpt.2006.877220 (2006).

[12] Tonouchi, M. Cutting-edge terahertz technology. Nat Photonics 1, 97-105, doi:10.1038/Nphoton.2007.3 (2007).

[13] Schurig, D. et al. Metamaterial electromagnetic cloak at microwave frequencies. Science 314, 977-980, doi: 10.1126/science.1133628 (2006).

[14] Fang, N. & Zhang, X. Imaging properties of a metamaterial superlens. Appl Phys Lett 82, 161-163, doi: 10.1063/1.1536712 (2003).

[15] Ebbesen, T. W., Lezec, H. J., Ghaemi, H. F., Thio, T. & Wolff, P. A. Extraordinary optical transmission through sub-wavelength hole arrays. Nature 391, 667-669 (1998).

[16] Chen, H.-T. et al. Antireflection Coating Using Metamaterials and Identification of Its Mechanism. Phys Rev Lett 105, 073901 (2010).

[17] Shchegolkov, D. Y., Azad, A. K., O'Hara, J. F. & Simakov, E. I. Perfect subwavelength fishnetlike metamaterial-based film terahertz absorbers. Phys Rev B 82, 205117 (2010).

[18] Landy, N. I. et al. Design, theory, and measurement of a polarization-insensitive absorber for terahertz imaging. Phys Rev B 79, 125104 (2009).

[19] Grant, J. et al. Polarization insensitive terahertz metamaterial absorber. Opt. Lett. 36, 1524-1526 (2011).

[20] Ma, Y. et al. A terahertz polarization insensitive dual band metamaterial absorber. Opt. Lett. 36, 945-947 (2011).

[21] Grant, J., Ma, Y., Saha, S., Khalid, A. & Cumming, D. R. S. Polarization insensitive, broadband terahertz metamaterial absorber. Opt. Lett. 36, 3476-3478 (2011).

[22] Smith, D. R., Vier, D. C., Koschny, T. & Soukoulis, C. M. Electromagnetic parameter retrieval from inhomogeneous metamaterials. Phys Rev E 71, doi:Artn 036617, doi:10.1103/Physreve.71.036617 (2005).

[23] Liu, X. L., Starr, T., Starr, A. F. & Padilla, W J Infrared Spatial and Frequency Selective Metamaterial with Near-Unity Absorbance. Phys Rev Lett 104, doi:Artn 207403, doi:10.1103/Physrevlett.104.207403 (2010).

[24] Saxena, R. S., Bhan, R. K., Jalwania, C. R., Rana, P. S. & Lomash, S. K. Characterization of area arrays of microbolometer-based un-cooled IR detectors without using ROIC. Sensor Actuat a-Phys 141, 359-366, doi: 10.1016/j.sna.2007.10.033 (2008).

[25] Hesler, J. L. & Crowe, T. W. NEP and responsivity of THz zero-bias Schottky diode detectors. 2007 Joint 32nd International Conference on Infrared and Millimeter Waves and 15th International Conference on Terahertz Electronics, Vols 1 and 2, 827-828 (2007).

[26] Microtech. (http://www.mtinstruments.com/downloads/Pyroelectric%20Detector%20Datasheet.pdf).

[27] Ma, Y., Khalid, A., Drysdale, T. D. & Cumming, D. R. S. Direct fabrication of terahertz optical devices on low-absorption polymer substrates. Opt. Lett. 34, 1555-1557 (2009).

[28] Pendry, J. B., Holden, A. J., Robbins, D. J. & Stewart, W. J. Magnetism from conductors and enhanced nonlinear phenomena. Microwave Theory and Techniques, IEEE Transactions on 47, 2075-2084, doi:10.1109/22.798002 (1999).

[29] Smith, D., Padilla, W. J., Vier, D., Nemat-Nasser, S. C. & Schultz, S. Composite medium with simultaneously negative permeability and permittivity. Phys. Rev. Lett. 84, 4184-4187 (2000).

[30] Pendry, J. B. Negative refraction makes a perfect lens. Phys. Rev. Lett. 85, 3966-3969, doi:10.1103/PhysRevLett.85.3966 (2000).

[31] Pendry, J. B., Schurig, D. & Smith, D. R. Controlling electromagnetic fields. Science 312, 1780-1782, doi: 10.1126/science.1125907 (2006).

[32] Leonhardt, U. Optical conformal mapping. Science 312, 1777-1780, doi:10.1126/science.1126493 (2006).

[33] Landy, N. I., Sajuyigbe, S., Mock, J. J., Smith, D. R. & Padilla, W. J. Perfect metamaterial absorber. Phys. Rev. Lett. 100, doi:10.1103/PhysRevLett.100.207402 (2008).

[34] Tao, H. et al. A metamaterial absorber for the terahertz regime: Design, fabrication and characterization. Optics Express 16, 7181-7188, doi:10.1364/oe.16.007181 (2008).

[35] Lee, A. W. M. & Hu, Q. Real-time, continuous-wave terahertz imaging by use of a microbolometer focal-plane array. Opt. Lett. 30, 2563-2565, doi:10.1364/ol.30.002563 (2005).

[36] Lee, A. W. M., Williams, B. S., Kumar, S., Hu, Q. & Reno, J. L. Real-time imaging using a 4.3-THz quantum cascade laser and a 320×240 microbolometer focal-plane array. IEEE Photonics Technology Letters 18, 1415-1417, (2006)

[37] Ghaemi, H. F., Thio, T., Grupp, D. E., Ebbesen, T. W. & Lezec, H. J. Surface plasmons enhance optical transmission through subwavelength holes. Phys. Rev. B 58, 6779-6782, doi:10.1103/PhysRevB.58.6779 (1998).

[38] Barnes, W. L., Dereux, A. & Ebbesen, T. W. Surface plasmon subwavelength optics. Nature 424, 824-830, doi:10.1038/nature01937 (2003).

[39] Genet, C. & Ebbesen, T. W. Light in tiny holes. Nature 445, 39-46, doi:10.1038/nature05350 (2007).

[40] Chen, Q. & Cumming, D. R. S. High transmission and low color cross-talk plasmonic color filters using triangular-lattice hole arrays in aluminum films. Optics Express 18, 14056-14062 (2010).

[41] Inoue, D. et al. Polarization independent visible color filter comprising an aluminum film with surface-plasmon enhanced transmission through a subwavelength array of holes. Applied Physics Letters 98, 093113-093113 (2011).

[42] Verslegers, L., et al. Planar lenses based on nanoscale slit arrays in a metallic film. Nano Letters 9, 235-238, (2009).

[43] Lin, L., Goh, X. M., McGuinness, L. P. & Roberts, A. Plasmonic Lenses Formed by Two-Dimensional Nanometric Cross-Shaped Aperture Arrays for Fresnel-Region Focusing. Nano Letters 10, 1936-1940, doi:10.1021/nl1009712 (2010).

[44] Chen, Q. & Cumming, D. R. S. Visible light focusing demonstrated by plasmonic lenses based on nano-slits in an aluminum film. Optics Express 18, 14788-14793 (2010).

[45] Huo, Y., Fesenmaier, C. C. & Catrysse, P. B. Microlens performance limits in sub-2 µm pixel CMOS image sensors. Opt. Express 18, 5861-5872 (2010)

[46] Catrysse, P. B. & Wandell, B. A. Integrated color pixels in 0.18-µm complementary metal oxide semiconductor technology. J. Opt. Soc. Am. A-Opt. Image Sci. Vis. 20, 2293-2306, doi:10.1364/josaa.20.002293 (2003).

[47] Chen, Q. et al. CMOS Photodetectors Integrated With Plasmonic Color Filters. IEEE Photonics Technol. Lett. 24, 197-199, doi:10.1109/lpt.2011.2176333 (2012).

[48] Chen, Q. et al. A CMOS Image Sensor Integrated with Plasmonic Colour Filters. Plasmonics, 1-5, doi:10.1007/s11468-012-9360-6 (2012).
[49] Schurig, D., Mock, J. J. & Smith, D. R. Electric-field-coupled resonators for negative permittivity metamaterials. Applied Physics Letters 88, 041109-041103 (2006).
[50] Padilla, W. J. et al. Electrically resonant terahertz metamaterials: Theoretical and experimental investigations. Phys. Rev. B 75, doi:10.1103/PhysRevB.75.041102 (2007).
[51] Bingham, C. M. et al. Planar wallpaper group metamaterials for novel terahertz applications. Optics Express 16, 18565-18575, doi:10.1364/oe.16.018565 (2008).
[52] Azad, Abul K. & Zhang, W. Resonant terahertz transmission in subwavelength metallic hole arrays of sub-skin-depth thickness. Opt. Lett. 30, 2945-2947 (2005).
[53] Laman, N. & Grischkowsky, D. Terahertz conductivity of thin metal films. Applied Physics Letters 93, 051105-051103 (2008).
[54] Jenkins, F. A. & White, H. E. Fundamentals of Optics. 4th edn, (McGraw-Hill, 1981).
[55] Rakić, A. D. Algorithm for the determination of intrinsic optical constants of metal films: application to aluminum. *Appl. Opt.* 34, 4755-4767 (1995).
[56] Palik, E. D. *Handbook of Optical Constants of Solids. Indexes: Volumes I, II and III*. (Academic Press).
[57] Tao, H. et al. Highly flexible wide angle of incidence terahertz metamaterial absorber: Design, fabrication, and characterization. *Phys. Rev. B* 78, 241103 (2008).
[58] Tao, H. et al. A dual band terahertz metamaterial absorber. *Journal of Physics D: Applied Physics* 43, 225102 (2010).
[59] Smith, D., Vier, D., Koschny, T. & Soukoulis, C. Electromagnetic parameter retrieval from inhomogeneous metamaterials. *Physical Review E* 71, 036617 (2005).
[60] N. I. Landy, C. M. Bingham, T. Tyler, N. Jokerst, D. R. Smith, and W. J. Padilla, *Phys Rev B* 79, 125104 (2009).
[61] B. A. Munk, *Frequency Selective Surfaces* (John Wiley and Sons, 2000).
[62] X. L. Liu, T. Tyler, T. Starr, A. F. Starr, N. M. Jokerst, and W. J. Padilla, *Phys Rev Lett* 107, 045901 (2011).
[63] W. L. Chan, H. T. Chen, A. J. Taylor, I. Brener, M. J. Cich, and D. M. Mittleman, Appl Phys Lett 94, 213511 (2009).
[64] D. Shrekenhamer, C. M. Watts, and W. J. Padilla, *Opt Express* 21, 12507-12518 (2013).
[65] H. Tao, E. A. Kadlec, A. C. Strikwerda, K. B. Fan, W. J. Padilla, R. D. Averitt, E. A. Shaner, and X. Zhang, *Opt Express* 19, 21620-21626 (2011).
[66] T. Maier and H. Brueckl, *Opt Lett* 35, 3766-3768 (2010).
[67] W. R. Zhu, X. P. Zhao, B. Y. Gong, L. H. Liu, and B. Su, *Appl Phys a-Mater* 102, 147-151 (2011).
[68] C. M. Watts, X. L. Liu, and W. J. Padilla, *Adv Mater* 24, Op98-Op120 (2012).
[69] L. Huang and H. Chen, Prog Electromagn Res 113, 103-110 (2011).
[70] X. P. Shen, T. J. Cui, J. M. Zhao, H. F. Ma, W. X. Jiang, and H. Li, Opt Express 19, 9401-9407 (2011).
[71] S. G. Kong, J. Heo, F. Boughorbel, Y. Zheng, B. R. Abidi, A. Koschan, M. Z. Yi, and M. A. Abidi, Int J Comput Vision 71, 215-233 (2007).
[72] R. Singh, M. Vatsa, and A. Noore, Pattern Recogn 41, 880-893 (2008).

The invention claimed is:

1. A focal plane array imaging system comprising a plurality of pixel sensors arranged in a periodic array on a common substrate, wherein each pixel sensor in the plurality of pixel sensors comprises:
a resonant metamaterial absorber, and
a micro-bolometer sensor mounted on the metamaterial absorber, and
wherein adjacent pixel sensors in the plurality of pixel sensors are separated by thermal isolation regions.

2. The focal plane array imaging system according to claim 1, wherein the metamaterial absorber of each pixel sensor has a symmetrical shape adapted to ensure the pixel sensor is polarization insensitive.

3. The focal plane array imaging system according to claim 1, wherein the metamaterial absorber of each pixel sensor has an asymmetrical shape adapted to ensure the pixel sensor is polarization sensitive.

4. The focal plane array imaging system according to claim 1, wherein the resonant metamaterial absorber of each pixel sensor comprises an electric ring resonator (ERR) structure.

5. The focal plane array imaging system according to claim 4, wherein the electric ring resonator structure is cross-shaped.

6. The focal plane array imaging system according to claim 1, wherein the resonant metamaterial absorber of each pixel sensor comprises an electrically conductive ground layer, a layer of dielectric material on the ground layer, and an electrically conductive active layer separated from the ground layer by the dielectric material, wherein the active layer has a resonant geometry selected to couple electric field components of an incident THz radiation wave.

7. The focal plane array imaging system according to claim 6, wherein the resonant metamaterial absorber of each pixel sensor further comprises:
a second electrically conductive active layer mounted in the dielectric material between the electrically conductive active layer and the electrically conductive ground layer,
wherein the second electrically conductive active layer comprises a plurality of resonant structures arranged to couple to the electric field of an incident infrared (IR) radiation wave.

8. The focal plane array imaging system according to claim 6, wherein absorption characteristics of the resonant metamaterial absorber is controlled through selection of any one or more of:
(i) geometry of the active layer,
(ii) the thickness of the dielectric layer,
(iii) dielectric properties of the dielectric layer,
(iv) period of the pixel sensors in the array.

9. The focal plane array imaging system according to claim 1, wherein the plurality of pixel sensors provides a plurality of resonant geometries to permit dual band or broadband absorption across the THz radiation frequency range.

10. The focal plane array imaging system according to claim 1, wherein the plurality of pixel sensors is arrayed with a period in the range 2 to 150 μm.

11. The focal plane array imaging system according to claim 6, wherein the micro-bolometer sensor comprises a heat sensitive element mounted in thermal communication with the active layer of the resonant metamaterial absorber.

12. The focal plane array imaging system according to claim 11 having an electrically insulating layer between the heat sensitive element and the active layer.

13. The focal plane array imaging system according to claim 12, wherein the thermal isolation regions between adjacent pixel sensors comprise physical gaps between the electrically insulating layer, the dielectric layer and the ground layer of adjacent pixel sensors.

14. A detector comprising:
a resonant metamaterial absorber, and
a micro-bolometer sensor mounted on the metamaterial absorber,
wherein the metamaterial absorber comprises an electrically conductive active layer mounted on a first surface of a dielectric material, an electrically conductive ground layer mounted on a second surface of a dielectric material opposite the first surface, and
wherein the electrically conductive active layer has a resonant geometry arranged to couple to the electric field of an incident THz radiation or infrared (IR) wave.

15. A device comprising:
a metamaterial absorber comprising:
a layer dielectric material;
a first electrically conductive active layer mounted on a first surface of the dielectric material,
an electrically conductive ground layer mounted on a second surface of the dielectric material opposite the first surface, and
a second electrically conductive active layer mounted in the dielectric material between the electrically conductive active layer and the electrically conductive ground layer,
wherein the first electrically conductive active layer has a resonant geometry arranged to couple to the electric field of an incident THz radiation wave, and
wherein the second electrically conductive active layer comprises a plurality of resonant structures arranged to couple to the electric field of an incident infrared (IR) radiation wave.

16. The device according to claim 15 further comprising:
a micro-bolometer sensor mounted on the metamaterial absorber.

17. A combined plasmonic filter and THz radiation absorber device comprising a resonant metamaterial absorber having an electrically conductive ground layer, an electrically conductive active layer having a resonant geometry dimensioned to absorb electromagnetic radiation having a frequency up to 150 THz, and a dielectric material separating the ground layer from the active layer, the device includes a surface plasmon supporting layer patterned with a periodic array of surface discontinuities dimensioned to function as a plasmonic filter for optical radiation.

18. The combined plasmonic filter and THz radiation absorber device according to claim 17, wherein the plasmonic filter is adapted to transmit a predetermined band of radiation, and wherein the active layer and dielectric material are arranged to transmit the predetermined band of radiation.

19. The combined plasmonic filter and THz radiation absorber device according to claim 18, wherein the active layer include gaps therein for transmitting the predetermined band of radiation.

20. The combined plasmonic filter and THz radiation absorber device according to claim 18, wherein the predetermined band of radiation is optical radiation, and the dielectric material is transparent.

21. The combined plasmonic filter and THz radiation absorber device according to claim 17, wherein the surface plasmon supporting layer is the active layer or the ground layer.

22. A multispectral device for filtering optical radiation and absorbing THz radiation, the device comprising a plurality of filter/absorber hybrid cells mounted in a periodic array, each filter/absorber hybrid cell comprising:
a resonant metamaterial absorber having an electrically conductive ground layer, an electrically conductive active layer having a resonant geometry dimensioned to absorb electromagnetic radiation having a frequency up to 150 THz, and a dielectric material separating the ground layer from the active layer, and a surface plasmon supporting layer patterned with a periodic array of surface discontinuities dimensioned to function as a plasmonic filter for optical radiation.

23. The multispectral device according to claim 22, wherein the active layer and dielectric material are adapted to transmit optical radiation, and the ground layer is patterned with a periodic array of surface discontinuities to form the surface plasmon supporting layer for the transmitted optical radiation.

24. The multispectral device according to claim 22, wherein the plurality of hybrid cells is fabricated on a common ground layer.

25. The multispectral device according to claim 22, wherein the surface discontinuities comprise a triangular array of nanoholes formed in the ground layer.

26. The multispectral device according to claim 22, wherein the dielectric material is transparent to optical radiation.

27. The multispectral device according to claim 22 wherein the active layer is in the form of a hollowed out cross.

28. The multispectral device according to claim 22, wherein the surface plasmon supporting layer comprises an array of optical filter regions, each optical filter region being associated with a respective different period or diameter of holes fabricated on the surface plasmon supporting layer, wherein each optical filter region is sensitive to a different optical wavelength.

* * * * *